United States Patent [19]
Osborne et al.

[11] Patent Number: 5,751,951
[45] Date of Patent: May 12, 1998

[54] NETWORK INTERFACE

[75] Inventors: Randy B. Osborne, Newton; John H. Howard, Cambridge, both of Mass.; Ross T. Casley, Palo Alto; Douglas J. Hahn, El Cerrito, both of Calif.

[73] Assignee: Mitsubishi Electric Information Technology Center America, Inc., Cambridge, Mass.

[21] Appl. No.: 549,940

[22] Filed: Oct. 30, 1995

[51] Int. Cl.$^6$ .................................................. G06F 13/38
[52] U.S. Cl. ........................ 395/200.8; 364/242.94; 364/DIG. 1
[58] Field of Search .................. 395/200.01, 200.14, 395/200.15, 200.8, 200.66; 364/242.94, DIG. 1

[56] References Cited

U.S. PATENT DOCUMENTS

| | | | |
|---|---|---|---|
| 5,414,840 | 5/1995 | Rengarajan et al. | 395/617 |
| 5,535,214 | 7/1996 | Shiobara | 370/455 |
| 5,541,912 | 7/1996 | Choudhury et al. | 370/412 |
| 5,588,120 | 12/1996 | Shitara et al. | 395/200.15 |

*Primary Examiner*—John E. Harrity
*Attorney, Agent, or Firm*—Robert K. Tendler

[57] ABSTRACT

A packet based data transmission system includes a flexible optimized non-blocking transmit interface that incorporates optimized buffer modes, dynamic and static chaining, streaming and the utilization of small packet formats. Static chaining refers to connecting together the linked list for successive packets for the same transmit channel or virtual channel. Dynamic chaining refers to means by which the network interface performs this chaining automatically, thereby solving a blocking problem. On the transmit side, streaming refers to initiating the transmission of packet data before the entire packet data has been presented to the interface. This, in turn, permits more rapid recycling of the buffer space. On the receive side, streaming refers to initiating the processing of packet data before the entire packet has been received. The packet transmission system also includes a receive interface that incorporates a chunking system in which a buffer is divided into multiple chunks or segments to accommodate different size packets. Additionally, the receive interface includes an optimized linked list scheme to support chunking in which no linking element is required for the first buffer in the linked list. In one embodiment a small packet format is provided to reduce the relative overhead in sending small packets. In another embodiment the optimized buffer mode associated with the receive side can be utilized on the transmit interface for further reducing overhead.

21 Claims, 20 Drawing Sheets

NETWORK INTERFACE

FIELD OF INVENTION

This invention relates to data packet transmission systems and more particularly to data transmission systems in which the data comprising packets is organized into frames and in which the frames are sent via a channel or virtual circuit from transmitter to receiver, with each frame incorporating a description of this channel.

BACKGROUND OF THE INVENTION

Connection-based data transmission systems transmit data from a transmit side to a receive side over a connection or a so-called virtual channel between the transmitting node and the receive node through a number of network switches or nodes. In so doing packets of data, and in some systems their constituent subelements such as cells in ATM networks, are identified as to the virtual channel for their transmission from the transmit node to the receive node. In computers equipped for data transmission and reception with other networked computers and data systems, a network interface connects a host computer system to the physical network media, e.g. copper wire, coaxial cable, or optical fiber. The host computer is provided with a network interface which, for transmission, takes data buffers provided by the host computer containing packet data to be sent and causes these packets to be sent, with the network interface indicating to the host computer when these packets have been sent.

For reception, the host computer network interface provides empty data buffers in which incoming packets may be stored. The network interface fills host data buffers with packet data and then indicates to the host computer when complete packets have been received.

In addition to these functions, the network interface implements the physical layer and the data link layer functions as appropriate for the data communication scheme employed. The physical layer is the protocol for sending bits over the physical media such as coaxial cable or wire etc. The data link layer refers to a protocol for communicating a unit of data from one end of the network to the other. The network interface functions as appropriate for the data communication scheme employed, such as segmenting or dividing the packet into smaller data units, reassembling which is in opposite of segmenting, and performing flow control.

The packets of data to be transmitted are divided, if necessary, into smaller units for transmission and then encapsulated with appropriate control information to form a frame. While there are many ways in which data communication can work, for the purposes of the present invention, each frame is transmitted on a designated channel between a transmit node and a receive node, also referred to herein as a virtual channel or connection. For these types of data transmission systems, an identifier of the virtual connection or channel is carried within the frame.

The host and the network interface commonly use ring queues for communication of data and synchronization between the host and network interface. A ring queue, or circular queue, is a common data structure in which a first-in first-out or FIFO queue wraps around, such that the queue occupies a fixed size and extent of memory.

Typically, two of these ring queues are allocated for the transmit side and two to the receive side within the network interface. With respect to the transmit side, one of the queues in the transmit side indicates frames to be transmitted. Each entry in this "transmit input" queue describes a frame. Hence the entries are known as frame descriptors. The second queue on the transmit side is a "transmit complete" queue which contains descriptors of frames that have been transmitted. On the receive side, one queue is a "free buffer" queue containing descriptors describing empty buffers. A second queue on the receive side is typically a "receive complete" queue in which the entries are frame descriptors which describe the frame data which has been received.

Typically a ring queue has a "tail" or "in" pointer describing where additional entries may be added to the ring queue, and a "head" or "out" pointer describing where entries may be removed from the ring queue.

In operation, the host inserts a frame descriptor at the tail of the transmit input queue and notifies the network interface that there is a frame descriptor to be acted upon. There are, of course, many ways to notify the network interface that there is a frame descriptor to be processed. One way is for the network interface to respond to host updates to the tail pointer by reading the entry at the head position.

A second method for notification is for the host to write some other register to notify the network interface that there is a valid entry at the head of the ring queue. In conjunction with this method, there is often a "present" bit contained in the ring queue entry that indicates that the entry is valid. A third method of notification is for the network interface to poll the head position of the ring queue to repeatedly read this position. When it notices the present bit set, the entry contains a valid frame descriptor describing a frame to be transmitted. These aforementioned methods describe a process for notifying the network interface when the ring queue transits from an empty to a non-empty state.

The transmit complete queue has entries indicating the completion of the transmission of a frame of data. For such an output queue there are a number of different ways to indicate to the host that the ring queue contains a valid frame descriptor. One way is to interrupt the host and let the host examine the ring queue registers. Another way is for the host to poll the ring queue entries to determine that a presence bit is set, indicating that the entry contains a valid frame descriptor.

The functioning of the queues on the receive side is as follows. As on the transmit side, there is an input queue and an output queue. The input queue is the "free buffer" queue containing empty buffers. This queue functions similarly to the transmit input queue except that it is not so important that the host have efficient means for notifying the network interface of a valid entry or entries in this queue. The "receive complete" queue is an output queue analogous to the "transmit complete" queue, and notification to the host works similarly.

For general purpose computer systems the network interface is in the form of a network interface card or NIC which electrically and physically connects to the host computer by an input/output, I/O, bus. One example of such an I/O bus that is emerging in popularity, and hence importance in personal and workstation computers is the peripheral connect interface or PCI bus. Although the PCI bus is quite fast, it is still very much slower than memory access. Thus the PCI bus accesses can be a performance bottleneck, resulting in a requirement to minimize the required number to complete an operation, such as transmitting or receiving a frame.

PCI bus accesses are required for two purposes. The first is to transfer the actual data of the frame and the second is to load and store entries into the ring queues and read and write buffer descriptors. The latter is control overhead, which is desirable to minimize, especially for small messages for which overhead has a relatively larger performance impact;. Consequently, the number of I/O bus accesses constitutes overhead. It is therefore desirable in any network interface to minimize these accesses and thus the overhead. It is also, important to minimize driver and operating system interaction in the critical path of data transfer. I/O bus accesses and driver and operating system interaction both contribute to overhead in the data transfer process.

In the typical frame-based communication system as described above, there are major problems in both the transmit side and the receive side. Referring to the transmit side, there are at least four problems which must be solved in the design of a network interface. The first problem is to identify the data to be sent to the network interface. The second problem is the problem of blocking in which a frame for a particular connection or virtual channel blocks the transmission of frames for other connections or channels. A third problem is to notify the network interface in a fast and efficient manner that there is data available to be transmitted. Finally, there is the problem of ensuring low overhead for the transmission of small packets.

For small packets, if care is not taken in the design off the network interface and driver, the cost or overhead associated with transmitting small packets may be many times that of actually transmitting the data over the network. Small packets are particularly important for request-response styles of communication such as is common in client-server computing systems. It is therefore important that the design of the network interface accommodate small packets while at the same time being able to handle bulk data or large data packets.

On the receive side there are at least three problems in the design of a network interface. The first problem is to identify where to store arriving data. The second major problem revolves around the efficient use of empty buffers presented to the network interface by the host. Typically, the receive side has no idea of the frame size until after receiving the entire frame. This poses the problem of finding an appropriate sized empty buffer space at the host. Typical practice is to procure a large empty buffer for every arriving frame. The result is that every time a frame arrives, the network interface gets one buffer regardless of the frame size. In the case of large frames, multiple buffers may be required. In any event; in general the frame will not exactly fill the last buffer, resulting in an unused buffer fragment. For small frames, this fragmentation can be considerable, resulting in inefficient use of buffer space. For a small frame comprising 64 bytes, and buffer sizes of 2 kilobytes, 1984 bytes are unused, representing unused buffer space of 97%. Consequently, the host may have to dedicate more memory for the use of empty buffers than is required for the actual data. Typically, buffers must be resident in physical memory, and thus inefficient buffer use results in costly requirements for memory.

The third problem is ensuring low overhead for the reception of small messages.

Having described the problems facing the design for a network interface from the transmit side and receive side, in the past with respect to the identifying of data to be sent to the network interface, typically linked lists of buffers and buffer descriptors are used. Also there is typically a single transmit input queue of descriptors of such linked list frames.

The previously mentioned blocking problem can arise with systems which utilize such a single ring queue. This problem arises when a frame descriptor for one particular connection cannot be removed from the ring queue because the place to store the frame descriptor for that connection is already in use for storing a frame under transmission for the same connection. Since this frame descriptor cannot be removed from the transmit input queue, access is blocked to following frame descriptors in the queue and thus they cannot be removed from the queue even if they are for a different connection.

One solution to this problem is currently being implemented by Mitsubishi Electric Corporation of Japan which uses one form of a technique called dynamic chaining involving a linked list of frame descriptors and frames for each connection. When a potential blocking situation arises, the network interface removes the problematic frame descriptor within the transmit input queue, and moves it to a linked list of frame descriptors for that connection. As a result, frame descriptors previously blocked may be accessed. Moreover, the implementation of this method of removing frame descriptors involves an inefficient format of the frame descriptor in which the ring queue entry points to a frame descriptor, with that descriptor in turn pointing to the head of the linked list of buffers. In this scheme the frame descriptors are linked together separately from buffer descriptors, requiring considerable implementation complexity. Furthermore, the frame format for this implementation lacks the flexibility to permit chaining.

More importantly however, previous network interfaces as produced by companies such as Fujitsu, Texas Instruments and Digital have not addressed the problem of notification, because notification for large packets does not take up a significant proportion of the total time to transmit the message. On the other hand, for small packets, notification and overhead must be addressed.

On the receive side, network interfaces of Fujitsu and Texas Instruments address the problem of buffer space by having two "free buffer" queues, one for large size buffers and one for small size buffers. Connections are statically configured such that all frames arriving on a connection are received using either small empty buffers or large empty buffers. If there is a good correlation of connection with actual frame size, then this method works in a satisfactory manner. However, this often does not arise in practice and, of course, one cannot predict in advance the size of the frame and therefore into which size buffer to store the message.

To ensure low overhead for transmitting data, the number of non-data transfer operations, including I/O bus accesses and driver and operating system interaction, must be minimal. None of the prior art systems eliminate both driver and operating system interaction while at the same time minimizing the number of I/O bus accesses beyond those required for data transfer. As a result, prior art systems do not address the overhead function when addressing the transfer of data. One of the reasons that prior art systems have not addressed the minimization of latency is that previously no applications existed that required such low latency. While in the past there have been applications which required the low latency, these applications were generally performed on parallel processing machines as opposed to workstations and personal computers. Further, there has been a rapid increase in client-server computing, in which request-response communications is a significant portion of all traffic on the network. In these cases, low latency can benefit total system performance.

From all foregoing it will be seen that the design and implementation of a network interface is complicated, with trade-offs in the areas of buffer space and format which make the efficient implementation of such systems difficult. For instance, Fujitsu offers a network interface for ATM networks in the form of Model MB86686A which implements the transmit side and receive side in a complicated and inefficient manner. First, ring queues and buffer descriptors must reside in the network interface local memory. This incurs high overhead for host accesses to manage these structures, and leads to high overhead for notification. Second, buffer descriptors are confined to tables, and each buffer descriptor entry must be set up by the host to point to virtual channel information in a separate table.

Texas Instruments produces a chip for ATM networks, the Model NETA1561, in which the approach is relatively simple. This device solves the blocking problem by providing each connection with a ring queue. However, the blocking problem is only solved for the number of ring queues provided, which is in this case hard limited to 255 ring queues corresponding to only 255 connections. On the server side for client-server applications it is often times necessary to accommodate more connections. Moreover, in terms of notification for the transmission of a frame, the Texas Instrument system uses polling which is inefficient for two reasons. First, it is expensive for the host to initiate polling in the Texas Instrument interface. The host must invoke a driver operation, an expensive operation, to write the information to enable ring queue polling. Second, further inefficiency arises, because the network interface only polls when it is scheduled to send frame data. This means that if the queue is empty, no frame data is sent during a time slot even if other connections could have sent frame data at that time slot. The result is the waste of transmit bandwidth.

One further problem with the Texas Instrument network interface is that there is no frame streaming on the transmit side. As a result, the entire frame of data must be loaded into the ring queue before data transmission can be initiated.

On the receive side it will be appreciated that the Texas Instrument network interface does not do chunking. Rather, it has separate queues for two different sizes of empty buffers to accommodate different frame sizes.

SUMMARY OF THE INVENTION

In order to solve the above-mentioned problems, in general the subject network interface uses a frame descriptor which can flexibly indicate either a single buffer, including descriptive information such as the channel number and mode indicators, or the head of a linked list of such buffers. In the latter case each buffer has its own buffer descriptor. The formats of the frame and buffer descriptors provide for static chaining dynamic chaining, and streaming as will be discussed.

More specifically, in order to implement a network interface, either for use in direct access architectures or otherwise, in the subject invention means are provided to identify frames to send to the network interface by utilizing a linked list buffer format in which the ring queues contain multiword frame descriptors. Each such descriptor contains either a pointer to a data buffer, a pointer to the head of a linked list of buffers, or a combination of the two. The remaining words in the frame descriptor contain other information describing the frame, such as the virtual channel number, some state information and various mode indications. Thus in essence, the multiword frame descriptor constitutes a so-called "fat" pointer to the frame data. The normal mode is the so-called Mode M, in which a frame consists of a linked list of buffers. Each buffer in this linked list is described by a buffer descriptor. The frame descriptor points to the buffer descriptor for the first buffer in the list which then points to the next buffer descriptor for the next buffer in the linked list and so on. Note that the format of the frame and buffer descriptors are arranged to support static chaining, dynamic chaining and streaming.

Static chaining refers to the combining of the linked list representations of multiple frames for the same connection by the host before the host queues the chain in the transmit input queue. The benefit is that only one frame descriptor is required to describe multiple frames. Dynamic chaining refers to the same chaining result as in the static chaining process but this is accomplished through the operation of the network interface when successive frames arrive for the same connection. Dynamic chaining therefore offers a method for solving the blocking problem in an automatic fashion. Streaming refers to initiating a frame transmission or reception before all the frame data is available to give to the network interface.

As stated above, there are various optimizations of the frame format. One in particular, called Mode S, offers very low overhead for small frames. In Mode S, the frame descriptor points directly to a buffer. The frame descriptor thus doubles as the buffer descriptor in this case.

Another aspect of the subject invention is that notification is accomplished in an efficient manner via an application directly writing a frame descriptor in the transmit input queue. It will be appreciated that the network interface may be in one of two modes, polling and idle. In the polling mode the network interface will quickly find the frame descriptor in the transmit input queue and start the transmission. The efficiency comes from the ability of the application to write directly into the ring queue without driver or operating system intervention, and if polling is enabled, only one I/O bus operation is required. If the transmit input queue is not in polling mode, the application may write a notification register which causes the network interface to enter into the polling mode for a specified period of time.

On the receive side, the subject network interface performs a chunking function, which increases the efficiency of buffer use. Chunking refers to the dividing of the buffer region used for storing a received frame into a number of chunks. Each chunk is a buffer or less in size and contains the part of a frame that fits entirely within a buffer. Thus, a small frame might require only a single chunk, but a large frame might require a first chunk less than a buffer in size, then a chunk equal to a buffer, and then a chunk less than a full buffer in size. Chunking, or the dividing up of the buffer space, accommodates different size frames, thus eliminating unused buffer space. In order to accomplish this, assuming that a buffer has previously only been partially filled by a frame, the next incoming frame is stored into the current buffer starting at the end of the previous frame rather than being stored into an entirely empty or unused buffer.

Thus chunking fills the remaining buffer area after the end of the previous frame with other frames. If necessary, the system obtains another empty buffer for the remainder of the present frame. Assuming the frame is too long for this subsequent buffer, then a further empty buffer is obtained. Chunking thus simplifies the network interface and utilizes buffers more efficiently. Also, chunking, by virtue of its operation, eliminates the overhead of acquiring a new empty buffer on every frame arrival.

There are a variety of ways to implement chunking. In particular, the network interface either writes a frame descriptor for each chunk and uses streaming for multichunk frames; or writes one frame descriptor for the frame and produces a linked list of chunks directly. To construct such a linked list of buffers directly, the free buffer queue contains pointers to both empty buffers and free buffer descriptors, the latter to be used in linking together the buffers. Whenever the network interface dequeues an empty buffer pointer, it also dequeues a pointer to a free buffer descriptor.

In the case of chunking, there is a problem where a frame spans multiple buffers and the first chunk is not on a buffer boundary. In this case, the network interface may already have used the free buffer descriptor for a previous chunk. Thus the network interface has a chunk but no buffer descriptor with which to form a linked list. In the subject invention, this problem is solved by an optimized linked list format, called Optimized Mode M, in which the frame descriptor points directly to the first chunk in a linked list and also to a buffer descriptor which points to the second chunk and to the next buffer descriptor of the linked list. Consequently, no buffer descriptor is required for the first chunk in the linked list.

However, when the above scheme is employed there can be the problem of orphaned buffer descriptors. An orphaned buffer descriptor arises when the network interface uses only the empty buffer provided in the buffer input queue and not the free buffer descriptor. This situation arises when one or more short frames are stored into a buffer followed by a frame requiring multiple buffers. In this case each of the short frames requires no buffer descriptor, electing instead to use a Mode S buffer format, described below. Since the multi-buffer frame utilizes an Optimized Mode M format, no frame utilizes the free buffer descriptor associated with the free buffer. Thus the buffer descriptor is orphaned.

One solution to this orphaned buffer descriptor problem is to always use the Mode M format for any frame which starts at the first chunk in an empty buffer. Since Mode M always consumes a buffer descriptor, this ensures that the free buffer descriptors will always be used.

Note that chunking requires the following formats: Mode S, Mode M, and Optimized Mode M. Mode S is utilized for short frames fitting within a buffer, Mode M is utilized for frames beginning on a buffer boundary, and Optimized Mode M is utilized for multi-buffer frames that do not begin on a buffer boundary. The overall invention is a uniform format for frame descriptors and buffer descriptors to permit all of these frame modes to coexist, to permit static and dynamic chaining, and to permit streaming, and to permit chunking on the receive side.

In summary, a packet based data transmission system includes a flexible optimized non-blocking transmit interface that incorporates optimized buffer modes, dynamic and static chaining, streaming and the utilization of small packet formats. Static chaining refers to connecting together the linked list for successive packets for the same transmit channel or virtual channel. Dynamic chaining refers to means by which the network interface performs this chaining automatically, thereby solving a blocking problem. On the transmit side, streaming refers to initiating the transmission of packet data before the entire packet data has been presented to the interface. This, in turn, permits more rapidly recycling of the buffer space. On the receive side, streaming refers to initiating the processing of packet data before the entire packet has been received. The packet transmission system also includes a receive interface that incorporates a chunking system in which a buffer is divided into multiple chunks or segments to accommodate different size packets. Additionally, the receive interface includes an optimized linked list scheme to support chunking, in which no linking element is required for the first buffer in the linked list. In one embodiment a small packet format is provided to reduce the relative overhead in sending small packets. In another embodiment the optimized buffer mode associated with the receive side can be utilized on the transmit interface for further reducing overhead.

BRIEF DESCRIPTION OF THE DRAWINGS

These and other features of the Subject Invention will be better understood taken in conjunction with the Detailed Description in conjunction with the Drawings of which.

DETAILED DESCRIPTION

Non-Optimal Systems

In general, to achieve low overhead communication, a major requirement is to eliminate the operating system in the critical path of data transmission and reception. A network interface may be organized into a direct access architecture to meet this requirement. The direct access architecture is characterized by a number of direct access channels, with each direct access channel assigned a number of connections. In the system there is a dedicated set of ring queues, with each channel having its own set of four ring queues, two for transmission and two for reception. Dedicated memory spaces are allocated to each direct access channel, with an address translation mechanism being provided to insure that addresses specified by the host lie within the appropriate dedicated memory space and are translated to physical addresses for manipulation by the network interface. This structure eliminates the need for operating system interaction between the application and the network interface for data transfer operations.

It is assumed in the subject invention that the network interface hardware supports the direct access architecture. Consequently, the application has direct access to the ring queues for initiating a message send and retrieval. However, while the direct access architecture significantly reduce overhead by eliminating driver and operating system interaction in the critical path, this technique alone does not achieve minimal latency. Moreover, systems typically provide a general purpose data transfer facility, which, because it must be universal, tends not to be optimized for small frame transfer. Consequently, small frames incur higher than necessary overhead.

Figure 1A:
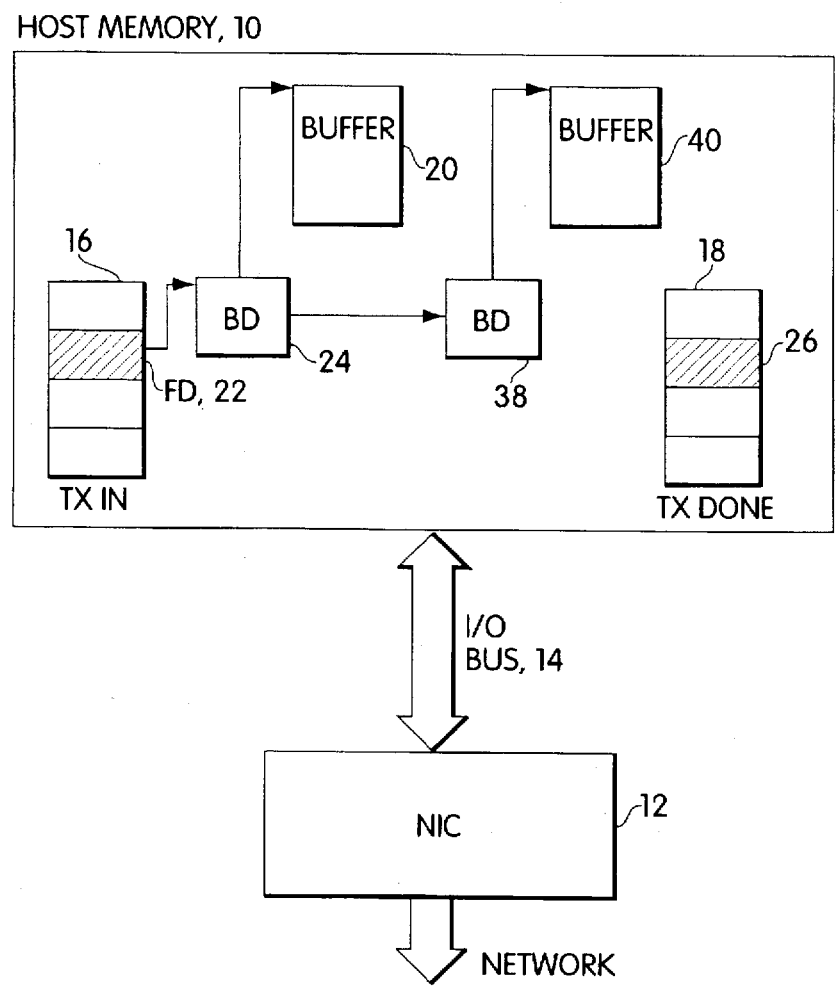
FIG. 1A is a diagrammatic showing in block form of the transmit side of a network interface card or NIC having two ring queues in host memory, one input ring queue labelled TXin for frames to be transmitted, and one output ring queue labelled TXdone for frames that have been transmitted.

Referring now to FIG. 1A, in the prior art on the transmit side a host memory 10 is coupled to the network via a network interface card or NIC 12 via an I/O bus 14. Ring queue 16 is a transmit input queue, called the TXin queue, containing as entries frame descriptors 22. Frame descriptor 22 points to a linked list of buffer descriptors 24 with buffers at 20 and 40 containing the data to be transmitted. After a frame of information has been transmitted, the frame is written into a transmit complete queue 18 called TXdone queue as a frame descriptor 26 which points to buffer descriptor or BD 24. This indicates to the host system that the frame descriptor and its associated buffer descriptors and buffers are no longer in use by the transmission mechanism.

In operation, network interface card 12 reads the next frame descriptor entry 22 in ring queue 16 indicated by the "out" pointer to obtain the address of a buffer descriptor. The network interface then reads the buffer descriptor as from buffer descriptor 24 corresponding to this address and extracts the base address and size of the corresponding buffer, here buffer 20. Next, the network interface reads data from buffer 20, starting at the above-mentioned address, transmitting the data as it reads it. After the data held in buffer 20 has been read out and sent, network interface 12 reads a next pointer in buffer descriptor 24 which points to a further buffer descriptor 38 that in turn is associated with a further buffer 40. Data in buffer 40 is read out starting at the address in buffer descriptor 38. This process continues until the end of the linked list of buffer descriptors and buffers. The last buffer descriptor in this linked list has a null next pointer. After the last data for a frame has been transmitted the network interface writes into the TXdone queue a frame descriptor 26 pointing to the same linked list as frame descriptor 22.

Figure 1B:
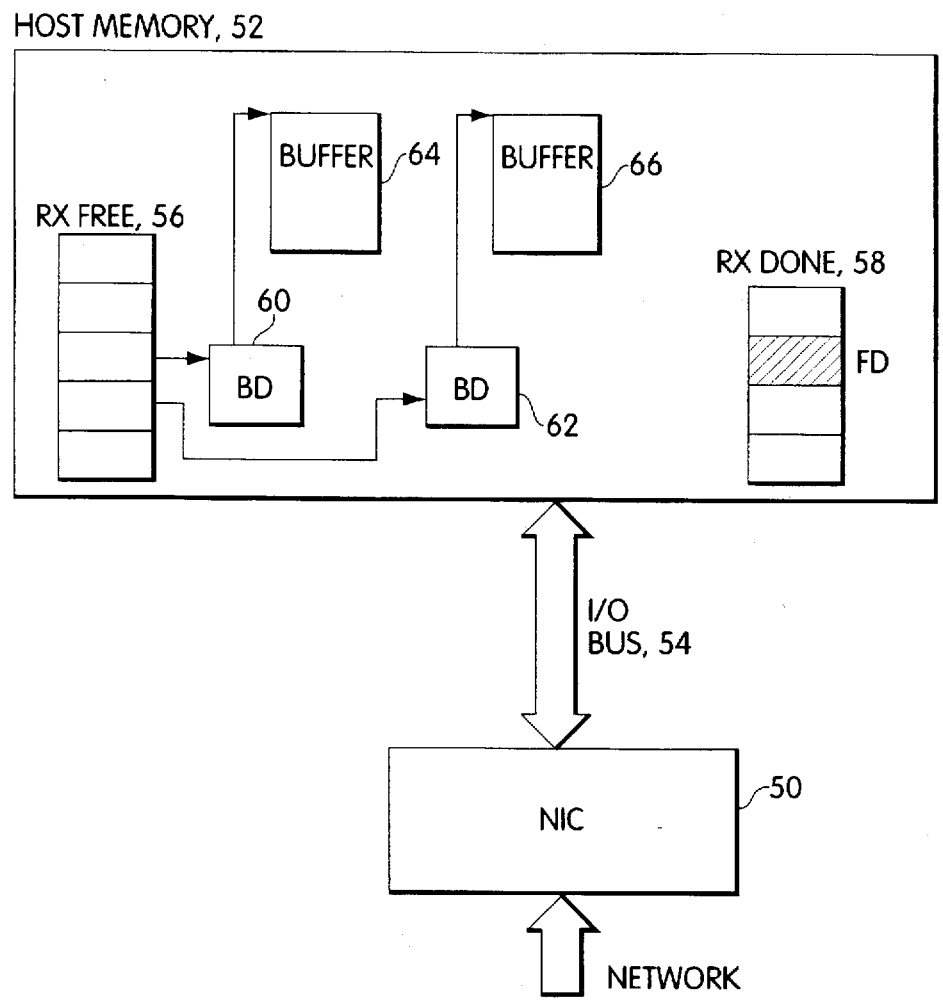
FIG. 1B is a diagrammatic illustration in block form of the receive side of a network interface having two ring queues in host memory, one input ring queue labelled free buffer queue for an empty buffer, and one output queue labelled RXdone for frames of received buffers.

Referring now to FIG. 1B, on the receive side, frame data is received by network interface card 50 which transfers the data to host memory 52 via I/O bus 54. Host memory 52 is organized to include a free buffer ring queue 56, hereafter called RXfree, and a receive ring queue 58, hereafter called RXdone. Each entry in the RXfree queue is a descriptor which points to a buffer descriptor, such as buffer descriptor 60, which in turn points to a free buffer such as buffer 64.

In operation, when a frame arrives for a virtual channel, NIC 50 reads free buffer queue 56 to obtain a pointer to a free buffer descriptor and a free buffer, such as buffer descriptor 60 and buffer 64. Thereafter, the frame data arriving for the same virtual channel is transferred to consecutive locations in buffer 64. If buffer 64 becomes full, then it is necessary to read another entry from the free buffer queue 56 to obtain another free buffer descriptor, in this case buffer descriptor 62. NIC 50 writes a pointer to buffer descriptor 62 into buffer descriptor 60 in order to indicate the continuation of the frame to buffer 66 and then proceeds to store frame data to buffer 66. This process continues until receipt of an end of frame indication at which point NIC 50 writes a frame descriptor into an RXdone queue 58 containing a pointer to the first buffer descriptor in the list for that frame. This completes the receive side data transfer.

The preceding describes the host-network interface for a generic connection-based network. While the subject invention substantially applies to a generic network, it has been specialized in particular for Asynchronous Transfer Mode or ATM networks. Henceforth, all discussion assumes a host-network interface for ATM networks.

Figure 1C:
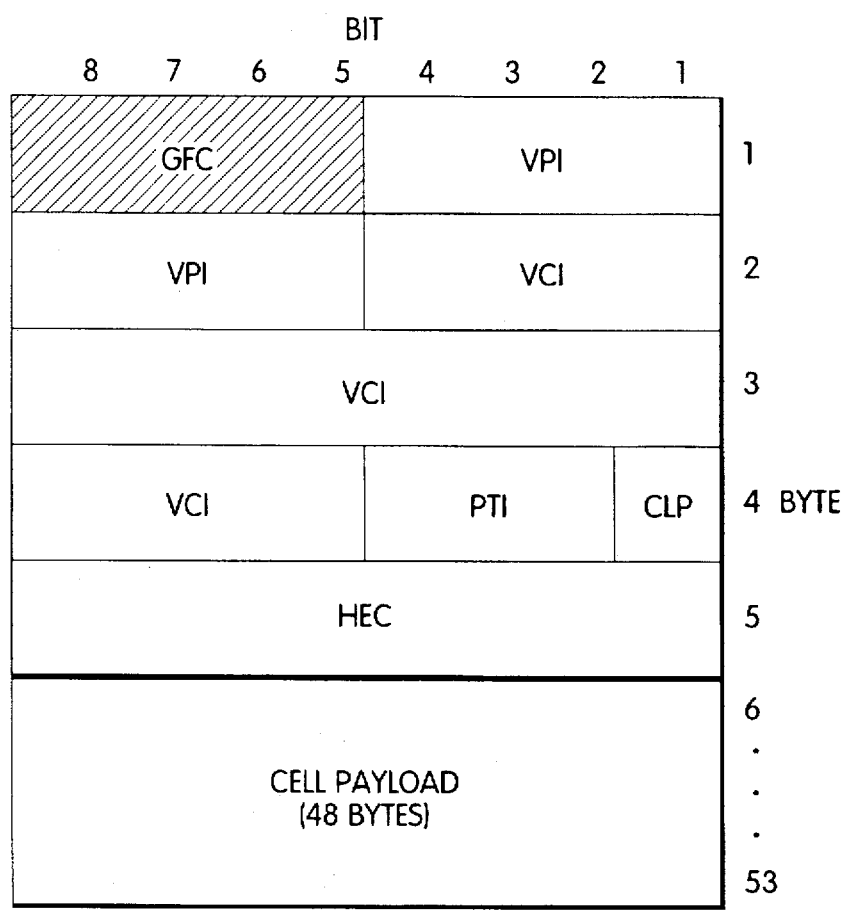
FIG. 1C is a diagrammatic representation of an ATM cell.
Figure 1D:
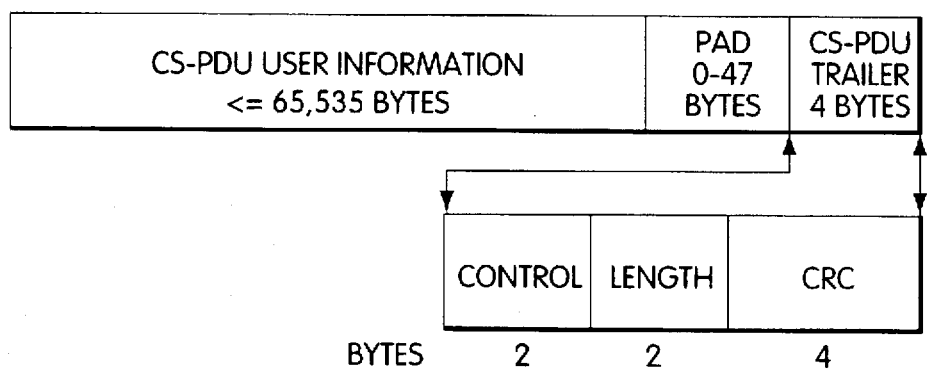
FIG. 1D is a diagrammatic illustration of an AAL5 frame.

In an ATM network, data is sent in cells. Each cell is 53 bytes in size, consisting of a 5 byte header and 48 bytes of payload as shown in FIG. 1C. The header format is well-known and is described in various standards documents, e.g., T1 LB 310 "Broadband ISDN ATM Layer Functionality and Specification", January 1993. Briefly, the header consists of a 4 bit GFC field, a 24 bit VPI/VCI field which describes the virtual channel, a 4 bit PTI, a 1 bit CLP, and an 8 bit header checksum, with GFC referring to generic flow control, VPI/VCI referring to virtual path indicator/virtual channel indicator, and CLP referring to cell loss priority. To make an ATM network more convenient to use, the ATM cell layer is usually wrapped in an ATM Adaptation Layer or AAL. One such format commonly used for data transfer is AAL5. FIG. 1D shows a diagram of the AAL5 format. This format is well-known and described in various standards documents. Briefly, in the AAL5 format a user data packet of up to 65535 bytes is padded with null bytes and followed by an AAL5 trailer consisting of 2 bytes of control information, 2 bytes specifying the packet data size, and 4 bytes of CRC, cyclic redundancy check. The 2 bytes of control information and 2 bytes of packet size are referred to hereafter collectively as common part convergence sublayer or CPCS INFO. The padding is chosen so that the entire unit, called a frame herein, is an integral number of ATM cell payloads. Dividing a AAL5 frame into 48 byte payloads for encapsulation in ATM cells is called segmentation. The reverse, extracting the 48 byte payloads from ATM cells to form a frame, is called reassembly.

In addition to the generic structures shown in FIGS. 1A and 1B, ATM network interfaces typically have a virtual channel table, or perhaps separate tables for transmit and receive, in local NIC memory. Each entry of this table contains state information for each virtual channel, including the current position of segmenting and transmitting the input frame for the associated channel and the current position of reassembling cells received on that channel into a buffer to later comprise a received frame. The network interface directs, or demultiplexes, incoming cells to the appropriate table entry and buffer based on the virtual channel information in the cell header.

Having described the generic system for the transfer and receipt of cells of information through the utilization of input and output queues and their respective frame descriptors, it will be appreciated that several problems exist both on the transmit side and on the receive side. With respect to the transmit side, by far the most important problem is the aforementioned problem of blocking. Head of the line blocking can occur when multiple frame descriptors for the same virtual channel are enqueued in buffer 16 ahead of a frame descriptor for a high priority virtual channel. In general operation the NIC retrieves entries from the TXin queue 16 until either the TXin queue is empty or it encounters a frame descriptor for a virtual channel that is already busy segmenting and transmitting a frame. The result is that all subsequent entries in the ring queue are not processed even if they correspond to virtual channels that are presently idle. In this sense, they are blocked. As will be described in connection with FIG. 2C, the Texas Instrument network interface reduces the likelihood of this problem by having 255 queues rather than one.

As will also be described later in connection with FIG. 2A a system under development by Mitsubishi Electric Corporation attempts to eliminate the blocking problem by dequeueing and dynamically linking frames for the same virtual channel. However, this technique is more complex than necessary, requiring an extra field in buffer descriptors to store the next frame pointer and requiring the network interface to store an additional pointer.

The next problem for the transmit side is the overhead involved in notifying the NIC that data is available for transmission.

A common way to affect notification is for the application to cause the tail pointer register to be updated to point to a newly enqueued entry in the ring queue. The problem is that the application cannot directly write into the ring queue or directly write the tail pointer register. Rather, it has to invoke the operating system to write this register. Such an OS operation can incur overhead as much 30 to 100 microseconds. While there are some applications for which such operating system overhead is tolerable, in order to achieve a low latency, invoking the operating system precludes application to application overall latency of 10 microseconds or better for a single switch network. Furthermore, since ATM frames can arrive as frequently as one every 3 microseconds, invoking the operating system is precluded for ATM.

Another overhead issue in terms of efficient NIC architecture is the overhead associated with the number of I/O bus operations required.

The number of I/O bus accesses necessary for control as can be seen from FIG. 1A are one to read the ring queue, one to read the buffer descriptor, and one per buffer thereafter. For a small frame of one cell in size, in which the number of I/O bus operations required for data transfer is 1, the control overhead would be two I/O bus operations to send the frame and a further operation to update the transmit done queue. This is an overhead of 300%. In other words, for small frames in order to send one cell of data, there are three I/O bus operations for control, a ratio of 3 to 1.

With respect to problems of the receive side, the major problem with network interfaces is buffer utilization, followed by overhead issues. In the past, one buffer is consumed regardless of the size of the received frame. Consequently, some portion of the last buffer is generally unused. This fragmentation of the buffer space can be substantial, especially in the case of a small frame. In the past both ATM network interface chips from Texas Instruments and Fujitsu utilized a system with two free buffer queues. The first free buffer queue is utilized for large size buffers, whereas the second queue is utilized solely for small size buffers. As a result, virtual channels are configured to receive using either the small free buffer queue or the large free buffer queue. This scheme works satisfactorily assuming that frames on a virtual channel have a uniform size that is accommodated by either the small or the large size buffers. However, these conditions are rarely true in practice. Using the large size free buffer queue results in fragmentation for small messages, whereas using the small size free buffer queue results in many buffers for a large message with the associated overhead for handling each buffer.

The problems of overhead on the receive side has two components: notification and I/O bus operations for control. Options for the network interface to notify the host that data has arrived include interrupting the host or having the host poll a status location. Unfortunately, in conventional network interfaces, both involve operating system overhead. Furthermore, since multiple applications share the ring queues, all accesses to the ring queue must be via the operating system, and thus operating system overhead is incurred in the critical path to read the RXdone queue.

With respect to I/O bus overhead, the number of control operations utilized on the receive side is: one to read the free buffer queue, one to read the free buffer descriptor, one to write the buffer descriptor, two per free buffer thereafter and one to write a descriptor into the RXdone queue. For a small frame of one cell, the total number of I/O bus operations is one for data transfer and four for control overhead, a control ratio of 400%.

Figure 2A:
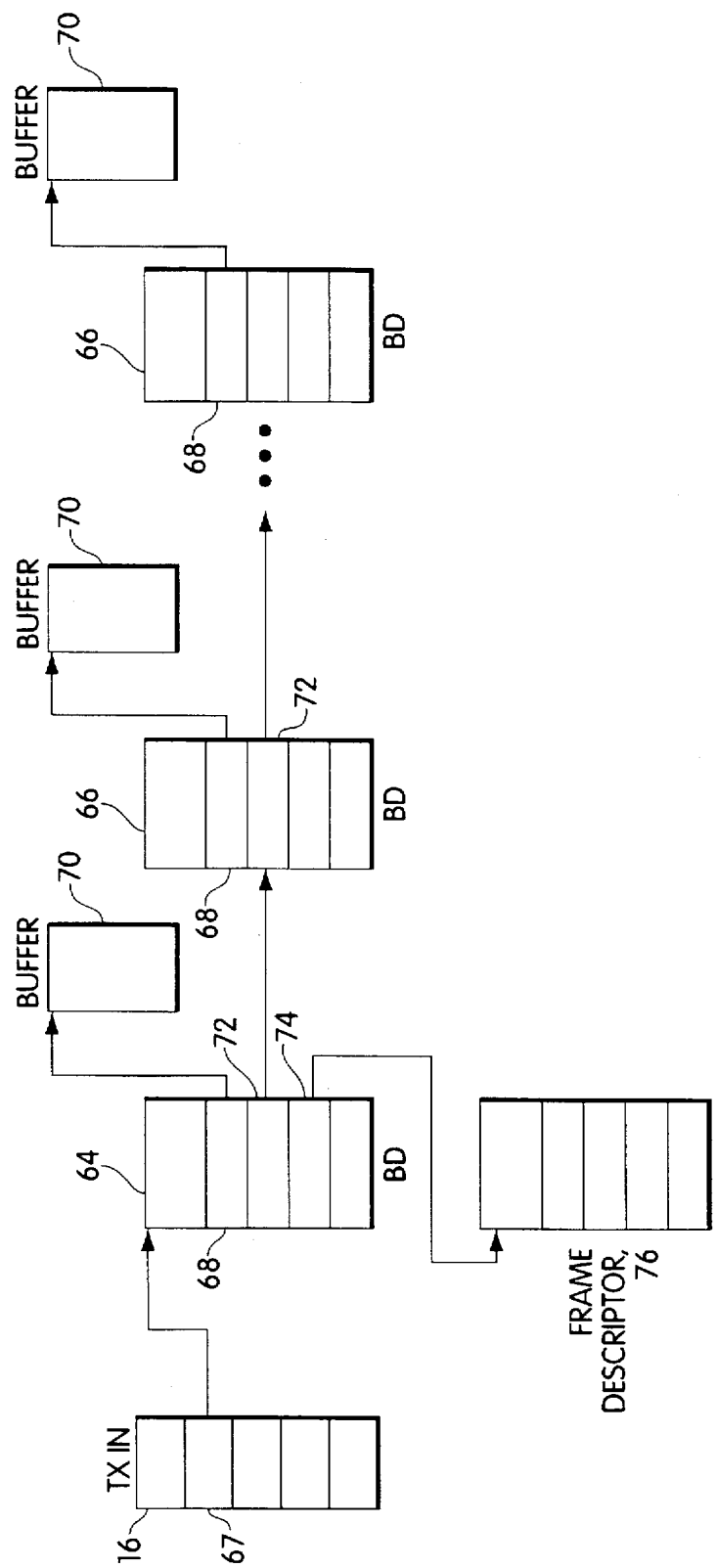
FIG. 2A is a diagrammatic illustration of a prior art network interface architecture provided by Mitsubishi Electric Corporation in which each ring queue entry is a pointer to a frame descriptor and a frame descriptor points to a linked list of frames as well as to a linked list of buffers comprising a frame.

Referring to FIG. 2A, as to the aforementioned blocking problem, Mitsubishi Electric Corporation has under development a system in which each entry 67 in ring queue 16 of FIG. 1A is a pointer which points to frames as shown in FIG. 2A. The frame and buffer descriptors 64 and 66 in FIG. 2A are all the same size. Each descriptor contains a pointer 68 to an associated buffer 70 and a pointer 72 to the next buffer descriptor for a frame. Each descriptor also contains enough fields so that the first descriptor can be used as a frame descriptor to describe all the information about the frame, including the virtual channel and transmit state. The frame descriptor also contains a pointer 74 to the next frame for the same virtual channel. When the network interface finds a new frame queued in ring queue 16 for a virtual channel that is currently busy sending a frame, the network interface writes a pointer to the frame descriptor 76 for this new frame into field 74 of this frame descriptor 64. Blocking is therefore eliminated in this system by taking the frame pointer out of the ring queue and writing into the frame descriptor at the next frame. The result is that frames are dynamically linked together to build a linked list in the buffer descriptor.

A drawback of this scheme that the NIC must maintain for each virtual channel a pointer to the frame descriptor of the last frame in the linked list of such frames for a virtual channel. This increases the amount of storage that the network interface must maintain per virtual channel. Furthermore, each buffer descriptor requires a next frame pointer field which is only used by the first buffer descriptor in a frame.

Figure 2B:
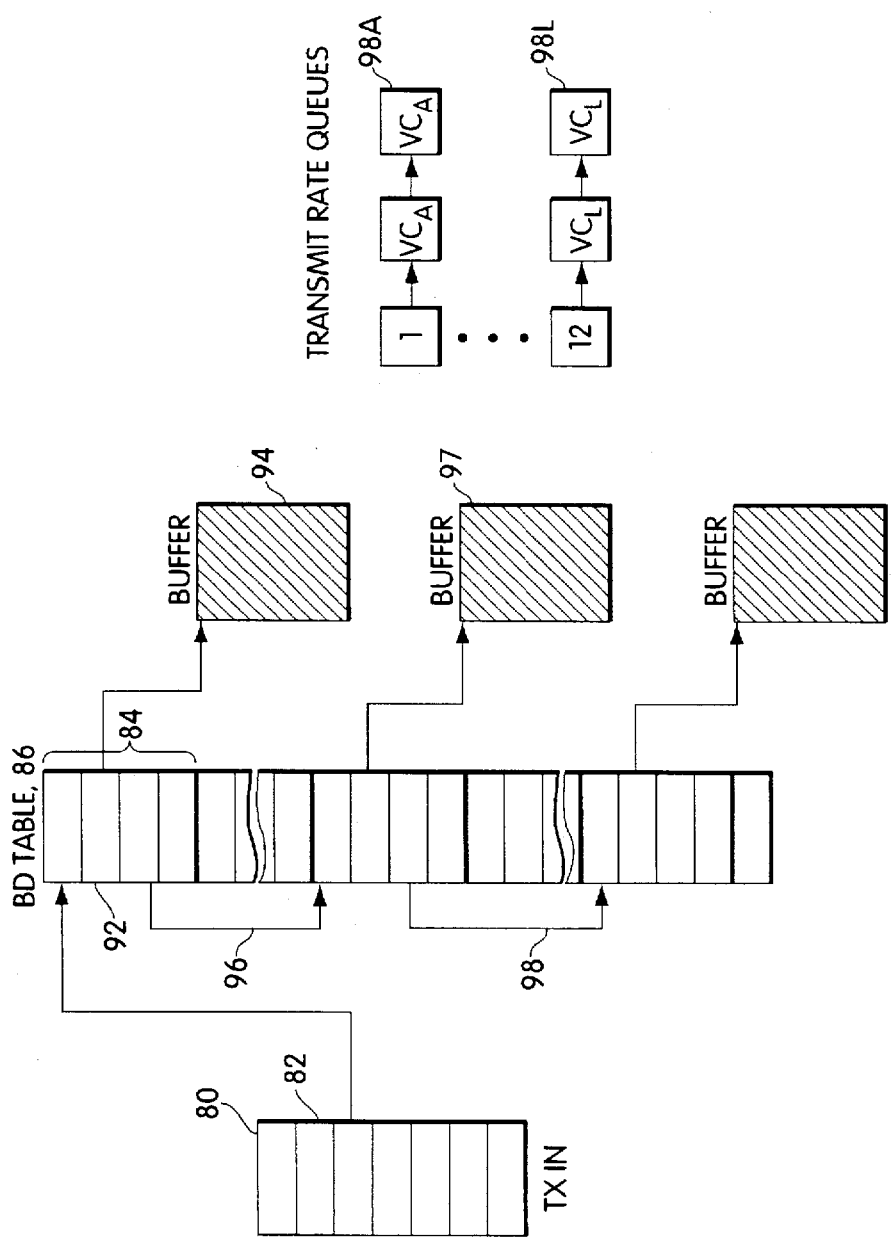
FIG. 2B is a diagrammatic illustration of the transmit side organization of a prior art system produced by Fujitsu.

Referring now to FIG. 2B, the Fujitsu interface has an input queue 80 in which each entry such as 82 is a single pointer to a transmit buffer descriptor such as 84 in a buffer descriptor table 86.

Buffer descriptor 84 has an entry 92 which is a pointer to a buffer 94. The transmit buffer descriptors are chained within the table as illustrated at 96 and 98. In operation, when the network interface finds an entry in input queue 80, it examines the buffer descriptor to determine on which virtual channel the buffer is to be sent. It then indexes into a circuit table to determine on which of 12 fixed rate queues the frame should be enqueued for transmission. These 12 queues are shown by references 98A-98L.

This solves the blocking problem referred to previously because entries in the transmit input queue are always removed to one of the 12 fixed rate transmit queues. However, this solution does not generalize to other than a small number of rates because of the limitation placed on the number of transmit rate queues. The system also does not extend to situations in which the transmission rate changes dynamically such as in available bit rate, ABR, systems because although frames may be initially enqueued on the same fixed rate queue, the frames may belong to different virtual channels and subsequently have their rates changed. In order to accommodate dynamic change of rates, the implementation of these transmit rate queues must become more complicated to allow the dynamic relocation of frames from one fixed rate queue to another to respond to the change in rate for a virtual channel.

On the receive side the Fujitsu system does not address problems of notification. Nor does it address the issue of buffer utilization other than that described in connection with FIG. 1B.

Figure 2C:
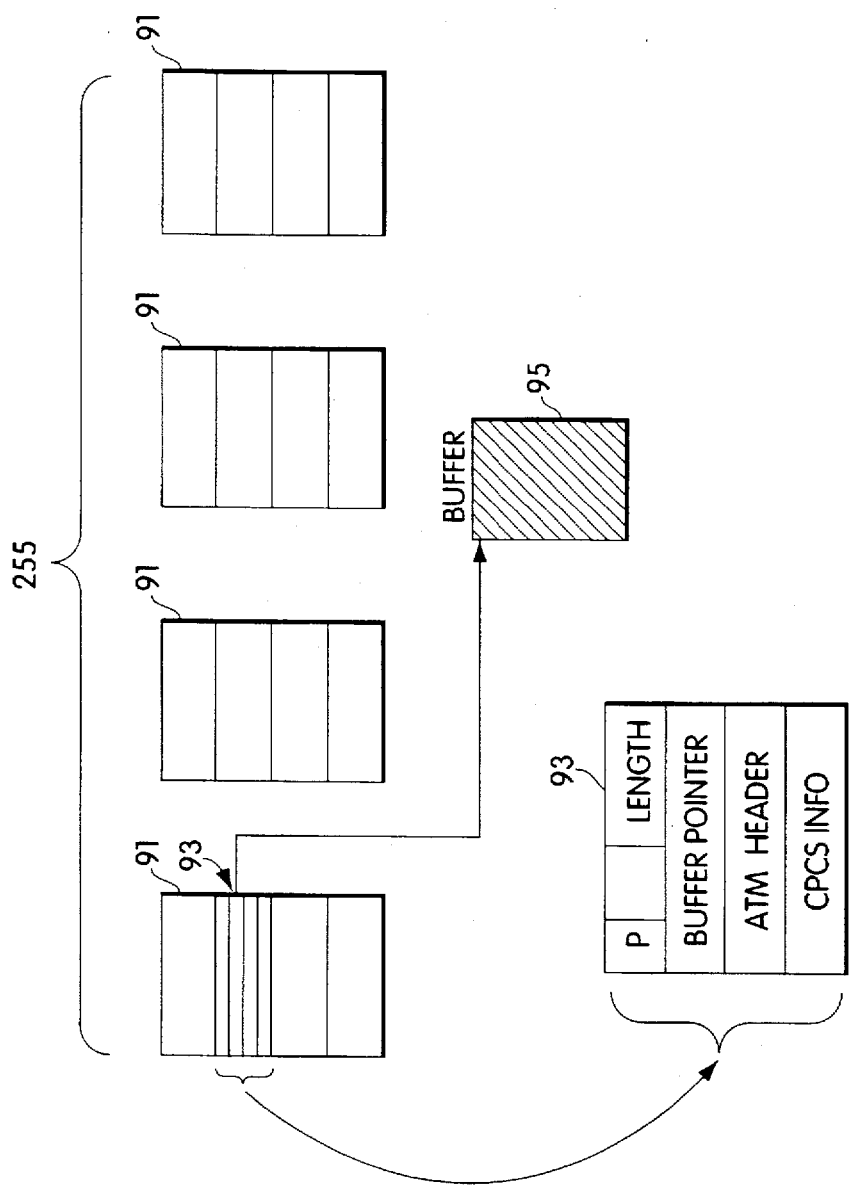
FIG. 2C is a diagrammatic illustration of the transmit side organization of a prior art system produced by Texas Instruments.

Referring now to FIG. 2C the Texas Instrument network interface network differs significantly from the generalized scheme shown in FIG. 1A in that it incorporates 255 input ring queues here illustrated at 91. Frames for different virtual channels are enqueued in different ring queues. Successive buffers for an input frame are enqueued in successive entries in the ring queue assigned to that virtual channel. This eliminates the need for a separate linked list using buffer descriptors as illustrated in FIG. 1A. Note that the format of each entry in a ring queue in ring 91 is shown by format 93 which includes a present bit P, the length, a buffer pointer, ATM cell header information and CPCS information. The buffer pointer field in format 93 points to buffer 95. This approach eliminates the aforementioned blocking problem by providing the 255 input ring queues to accommodate 255 virtual channels. However, this solution has the cost of managing 255 input ring queues. Also this approach does not scale to a large number of active transmit channels. Problems encountered for a large number, e.g. 4096 transmission channels, include the large space required for ring queues and the overhead of notifying the NIC which queue has data ready to send.

On the receive side the Texas Instrument network interface writes an entry into the RX done queue for every buffer that it filled eliminating the need for buffer descriptors, as on the transmit side. Consequently, the host must form multiple buffer frames into a linked list of buffers. The Texas Instrument system invokes the host operating system for notification purposes. In particular, even though the network interface polls the transmit input queues, the NIC must be told which input queues to poll, requiring an operating system operation.

Flexible Frame Descriptors

Figure 3A:
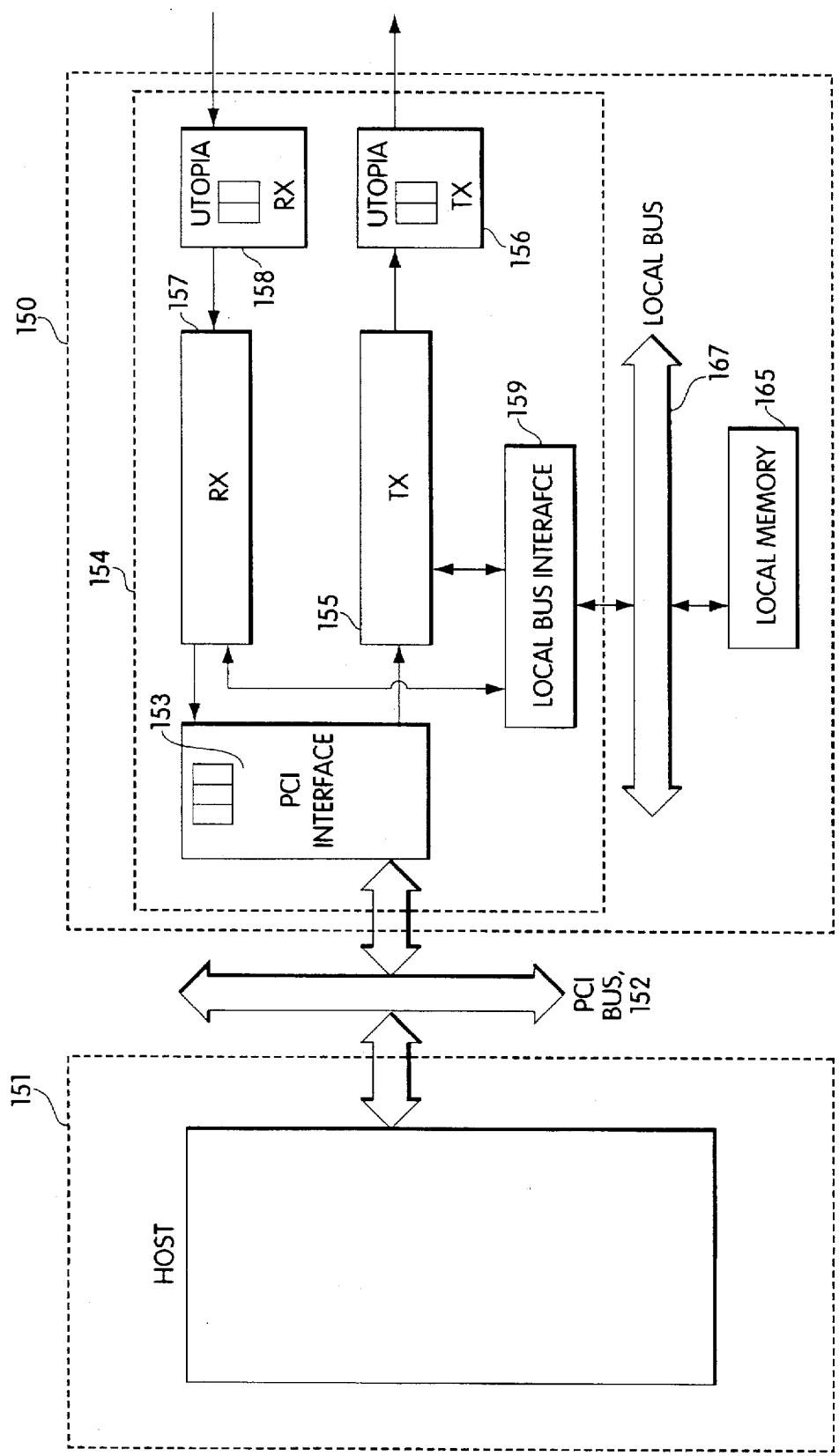
FIG. 3A is a block diagram showing an ATM network interface chip on a network interface card in which the subjects frame descriptors and buffer descriptors are used.

Referring to FIG. 3A, in the subject invention the flexible format of frame descriptors and buffer descriptors permit the aforementioned functions and advantages. To illustrate how this is possible in general, an ATM network interface includes a network interface card 150 and a host computer 151. The frame descriptors and buffer descriptors are used for communication between host 151 and network interface card 150 over peripheral component interconnect or PCI bus 152. The communication includes control information for the ring queues and information describing the data to be transmitted or describing data received. This information belongs to the network interface. Though the ring queue containing frame descriptors and the buffer descriptors are commonly in host memory, they may also be in network interface local memory.

As can be seen, PCI bus 152 is coupled to a PCI interface 153 which forms part of the NIC chip 154. PCI interface 153 makes the control and data information available to the rest of the chip. When the chip seeks information from host memory, PCI interface 153 generates the necessary control signals. PCI interface 153 is connected to a TX block 155 which performs the actions called for by the TXin and TXdone portions of the control information in host memory 151 and places cells on the network via a UTOPIA interface block 156 which is now standard in the industry.

Similarly, an RX block 157 is provided to perform the actions called for by the RXfree and RXdone portions of the control information stored in host memory 151. RX block 157 does so in response to signals from UTOPIA interface block 158.

Also provided is a local bus interface 159 which provides access to local memory 165 via local bus 167. The main purpose of local memory is to store per connection or virtual channel information for use by the RX and TX blocks, with this information being utilized to specify the virtual channels from one cell to the next. However, ring queues, buffer descriptors and/or data may also be stored in local memory.

It will be appreciated that all of the above blocks must be able to communicate using an agreed format for the control information.

By use of the subject control information format, great flexibility and efficiency in the transfer of information to and from the network is achieved. The prime reason for providing the flexibility for the various Mode M, Mode S, and Optimized Mode M formats is to be able to achieve efficient transmission of all types of network messages or frames.

Specifically, the RX and TX blocks are composed of circuitry designed specifically to interpret the control information format. In this sense, the frame descriptor format and the buffer descriptor format are embodied in these blocks. As such in one embodiment the subject invention is an RX circuit and a TX circuit configured to implement these formats.

Figure 3B:
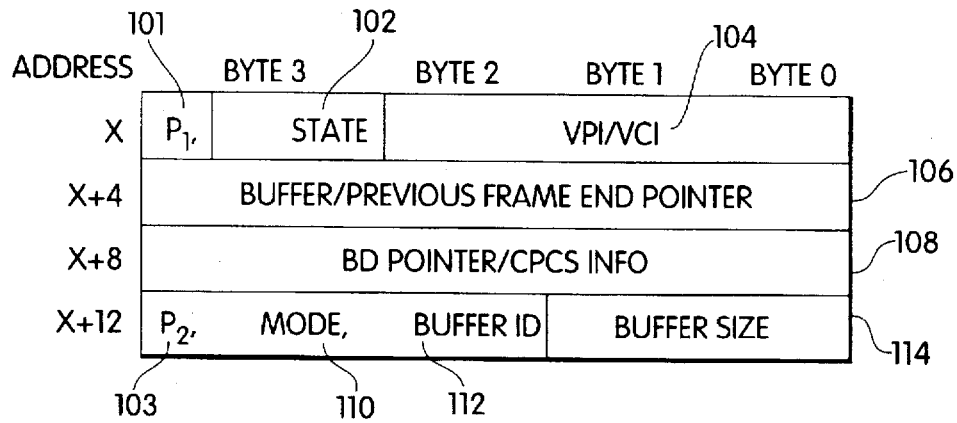
FIG. 3B is a diagrammatic illustration of the subject frame descriptor in which the frame descriptor has a buffer descriptor pointer, a pointer to the next buffer descriptor, and additional fields to identify the virtual channel or connection, to identify the mode of transmission of the data., to identify parameters such as buffer size, and to mark as valid entries in ring queues.

As will be seen, in contradistinction to the prior Mitsubishi and Fujitsu systems, in the subject system the ring queue format illustrated in FIG. 3B includes multiple fields. All memory adddress and words in the subject system are assumed to be 32 bits wide. Such a multiword descriptor allows complete information about a frame to be fetched or stored in one I/O bus operation.

On an I/O bus such as the PCI bus there is negligible difference in time between fetching/storing one 32 bit word in an access or four 32 bit words in an access. However, each I/O bus operation is relatively expensive compared to host accesses to main memory. Thus it is effective to collapse the traditional scheme, where a ring queue entry points to a descriptor object, into a single multiword entry. In essence, such a multiword descriptor can be thought of as a "fat" pointer.

The ring queue entry format shown in FIG. 3B is used for frame descriptors. A frame descriptor, or FD, represents the head of a chain of frames for a particular virtual channel, in particular, for enqueuing frames in the TXin queue, returning transmitted frames in the TXdone queue, and indicating received frames in the RXdone queue. FDs have the following general format. Slight differences exist in the specific format depending on the queue the FD is in with these differences being described later.

Bit $P_1$ at 101 and bit $P_2$ at 103 are present bits, indicating if the queue entry is valid or not. In order for the FD contents to be valid, both present bits must be set. Dual present bits allows the FD format to be the same regardless of where input or output queue, host memory or NIC local memory, the FD is located. This is discussed in detail later. Each present bit is in the most significant position so the host can test the present bit in a single test-if-negative instruction.

The state field at 102 is 7 bits wide indicating the TX or RX state, valid only in the TXdone and RXdone queues. In the TXin queue, the least significant bit of the state indicates the CLP bit value. This CLP value is set in every cell sent for that frame.

The VPI/VCI field at 104 contains the 24 bit combined VPI and VCI for the ATM header.

Depending on the frame mode in use, field 106 either contains a buffer pointer which points to the starting address of a data buffer, a pointer to the end of the previous frame sent for the same VPI/VCI, or NULL. Data buffers are assumed to be word aligned.

Depending on the frame mode in use, field 108 either contains a BD pointer which points to a buffer descriptor, described later, or the AAL5 trailer sans CRC containing the CPCS control information and the packet length.

The mode field at 110 is 4 bits wide containing frame mode bits described later.

Field 112 is an 11 bit buffer ID which the application may use, in an application specific way, such as to locate the buffer descriptor object associated with the buffer pointed to. The Buffer ID field is not interpreted by the NIC. Buffer size 114 is a 16 bit field giving the size in bytes of the buffer pointed to by field 106. In the TX direction, this size is the amount of data to send from that buffer and in the RX direction, this size is the amount of data written to the buffer. Although nominally in bytes, the size should be word aligned. In certain situations described later the most significant bits of the buffer size field are used instead for the PTI and CLP bits.

The present bits at 101 and at 103 are required because host accesses, reads or writes, to FDs may not be atomic. To avoid reading stale data, the producer must write the field with the present bit last and the consumer must read the field with the present bit first. The most convenient way to achieve this constraint is to have the producer and consumer access the descriptor in opposite order. However, many I/O buses, such as the PCI bus, constrain multiword burst accesses, such as to a descriptor, to increasing address order. For an input queue in host memory, placing the present bit in the first word of a descriptor allows the NIC to read the present bit first while reading the descriptor in ascending order. Likewise, for an output queue in host memory, placing the present bit in the last word of a descriptor allows the NIC to write the present bit last while writing the descriptor in ascending order. The Texas Instrument design has a single present bit in the most significant bit of the first word of descriptors in input queues and in the most significant bit of the last word of descriptors in output queues.

However, the method adopted by Texas Instrument is inconvenient for ring queues in NIC local memory where they are on the other side of the I/O bus and hence host initiated burst reads and writes must occur in ascending order. To meet the same constraint as before for an input queue that the host writes the present bit last and the NIC reads it first, either the NIC must now access the descriptor fields in reverse order or the descriptor format must be inverted. Either complicates the NIC. The subject system adds a second present bit to the descriptor. Both bits must be set for the descriptor to be valid. In the subject system the NIC accesses descriptors in NIC local memory atomically. These two features permit the descriptor to have the same format regardless of which queue it is located in and whether the queue is in host memory or local NIC memory. In all cases, the NIC always reads and writes descriptors in ascending address order, minimizing NIC complexity.

The format described by the frame descriptor in FIG. 3A permits a wide variety of functions to be incorporated into a network interface. On the transmit side the mode bits 110 permit special formats for different size messages. Moreover, the format permits static chaining, dynamic chaining and streaming to improve the overall performance on the transmit side. Both dynamic and static chaining as well as streaming will be described hereinafter. As will be further described later, one particular format permits a specialized mode called Optimized Mode M which supports chunking on the receive side to improve buffer efficiency.

Both the transmit side and the receive side of the subject network interface use buffer descriptors, BDs, having a specialized format to link together the buffers in a frame.

Figure 3C:
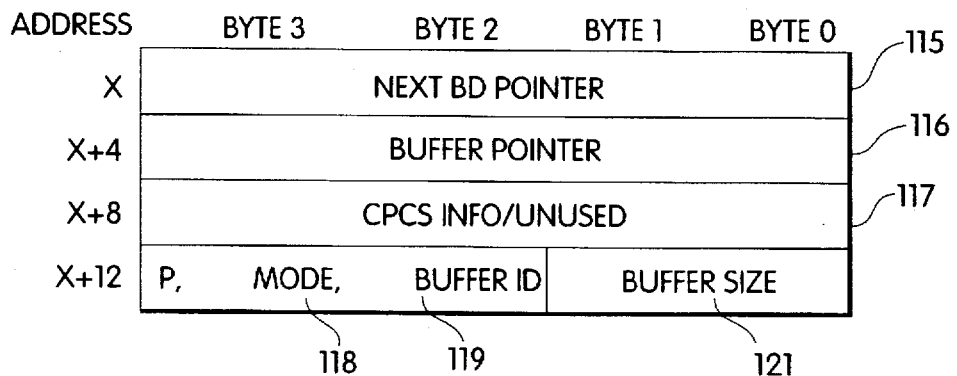
FIG. 3C is a diagrammatic illustration of the subject buffer descriptor in which a buffer descriptor and a frame descriptor have identical format except in the first word.

FIG. 3C shows the buffer descriptor format. Next BD pointer 115 points to the next BD in a linked list of BDs. Buffer pointer 116 points to the starting address of a data buffer.

All buffers are assumed to be 32 bit word aligned and multiple in size. All data transfers are in 32 bit word units. Thus the NIC only uses the 30 most significant bits of the buffer pointer field and the 14 most significant bits of the buffer size field. BDs are assumed to be quad 32 bit word aligned and thus the NIC only used the 27 most significant bits of the BD pointer field.

Field 117 is only used in the last BD for a frame to contain the AAL5 trailer sans CRC, i.e. the CPCS information.

With some minor exceptions the last word in BDs is the same as in FDs. The P bit is only used on the transmit side to indicate when to write a FD to TXdone in the streaming mode. The mode bits at 118 are unused except for the third bit which is used to indicate the last BD in a frame. Buffer ID 119 and buffer size 121 are the same as for FDs.

The format for the frame descriptor and the buffer descriptors are intentionally similar to permit flexibility required for optimizations to be described hereinafter. These optimizations include optimizing for non-blocking, optimizations to accommodate small messages, optimizations for streaming and to support chunking, and most importantly optimizations to eliminate the blocking problem described above.

Figure 3D:
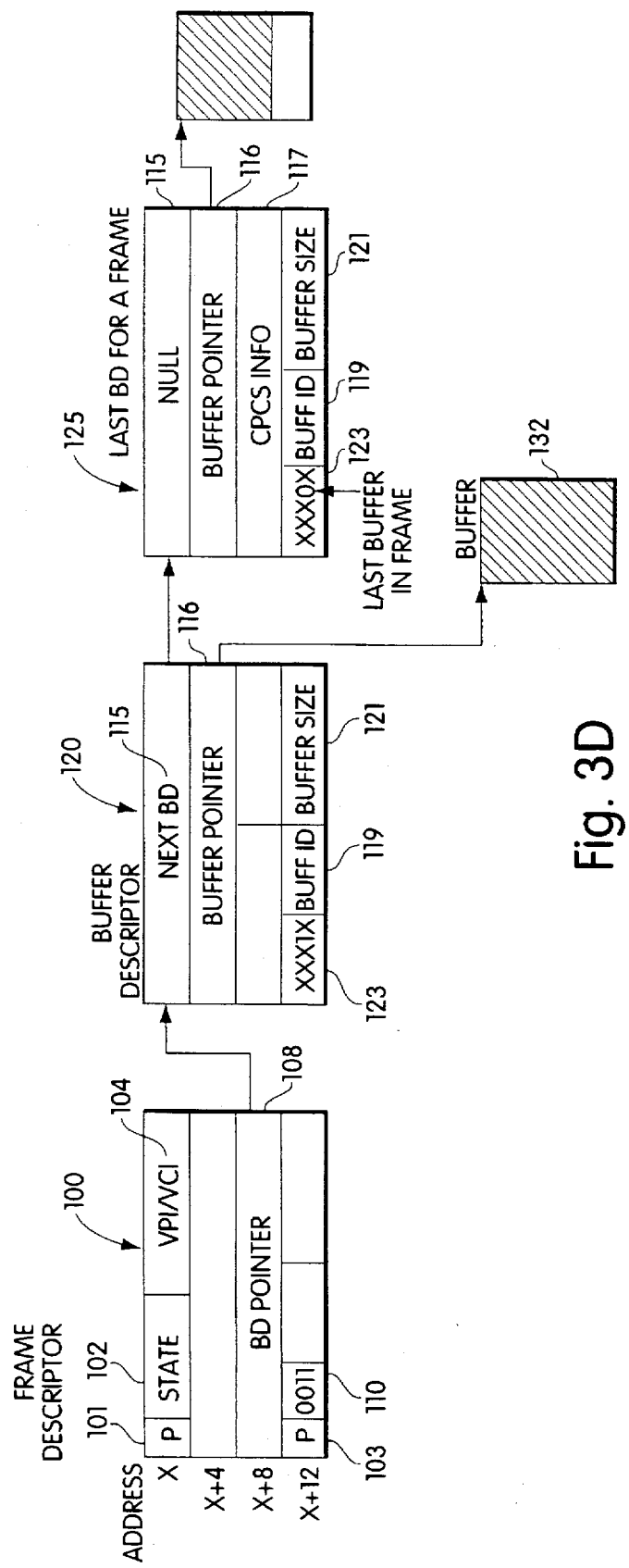
FIG. 3D is a diagrammatic illustration of the subject system in which a frame descriptor illustrates a multiple buffer Mode M format.

FIG. 3D describes a format referred to herein as Mode M Mode M is the simplest format, consisting in general of multiple buffers, yielding the M. The BD pointer 108 in FD 100 points to the first BD 120 in a linked list having a next BD field 115, a buffer pointer 116, a buffer ID field 119, a buffer size field 121 and a P bit plus mode field 123, with buffer descriptor 120 having buffer pointer 116 pointing to buffer 132. The last BD 125 in the linked list for a frame contains the CPCS information 117. The last BD in a linked list for a frame is indicated by a zero in the third mode bit within field 123.

To transfer a Mode M frame to or from the NIC requires one I/O bus operation for the FD and one I/O bus operation per BD plus data transfers. Thus, the control overhead in I/O bus operations for a Mode M frame is 1 plus the number of buffers, where in Mode M there is a one-to-one correspondence between buffers and BDs.

Figure 4:
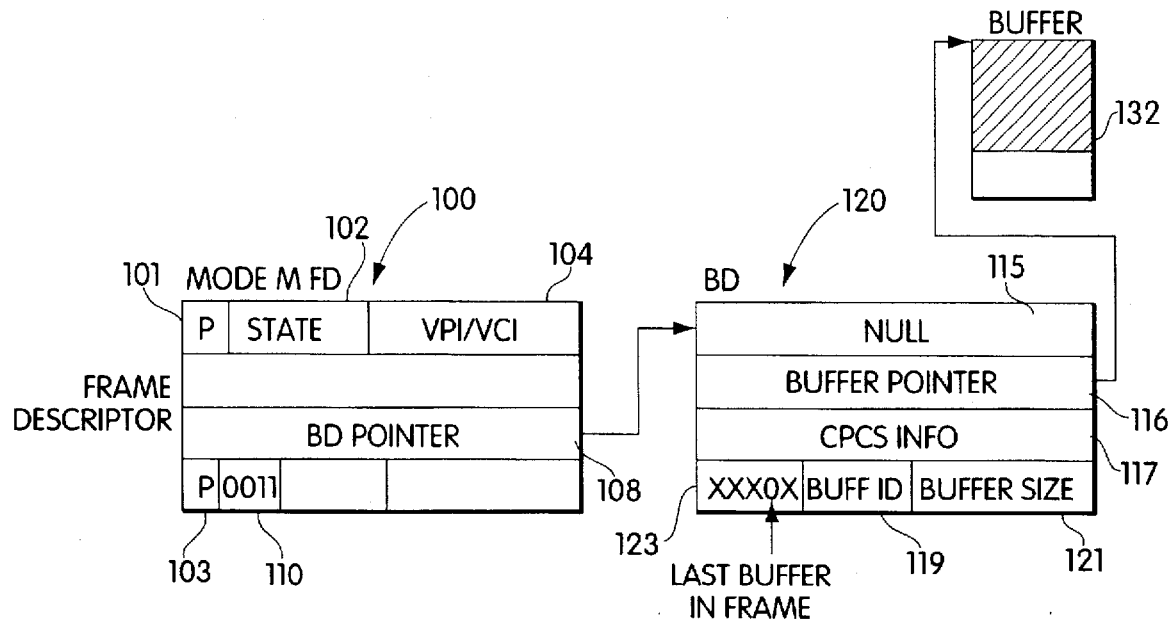
FIG. 4 is a diagrammatic illustration of a Mode M format frame consisting of a single buffer.

Referring now to FIG. 4 frame descriptor 100 and buffer descriptor 120 are utilized in a single buffer case in which the single buffer is buffer 132. For frames with only a single buffer, and no frame chained to that frame, then the next␣ED pointer is not needed and the BD in a Mode M frame can be optimized away: the FD and BD formats are arranged so that the required BD fields can be stored in a FD.

Figure 5:
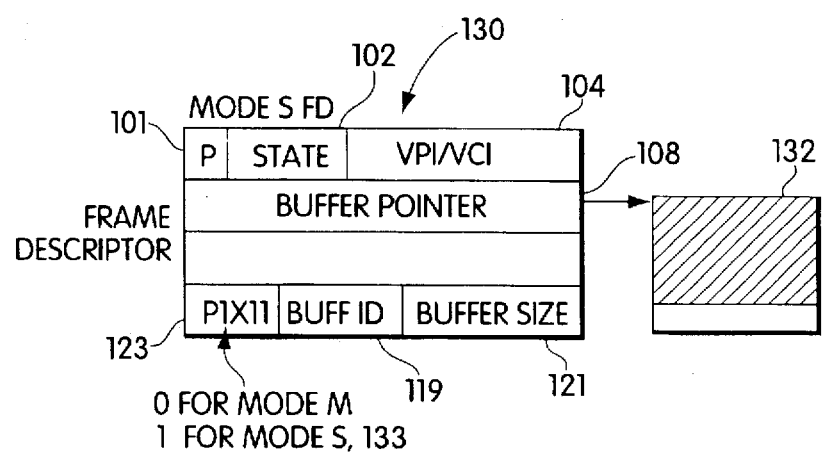
FIG. 5 is a diagrammatic illustration of a Mode S frame consisting of a single buffer to accommodate short frames.

FIG. 5 shows an example of this compressed mode, called Mode S to emphasize a single buffer. The frame descriptor 130 in FIG. 5 includes all the necessary information from FIG. 4 in buffer descriptor 120 and the frame descriptor 100. This produces what is termed herein as the Mode S format in which the frame descriptor points directly to the sole buffer comprising the frame. Mode S is especially suited for small frames with the control overhead being one operation to read the frame descriptor and one operation to write the similar frame descriptor into the transmit done queue. For a small frame comprising one cell this is a control overhead of two bus operations for an overhead of 200% compared to 300% of the prior described systems. Furthermore, this is the minimum control overhead that is achievable. The first mode bit at 133 distinguishes Mode S and M frames.

Figure 6:
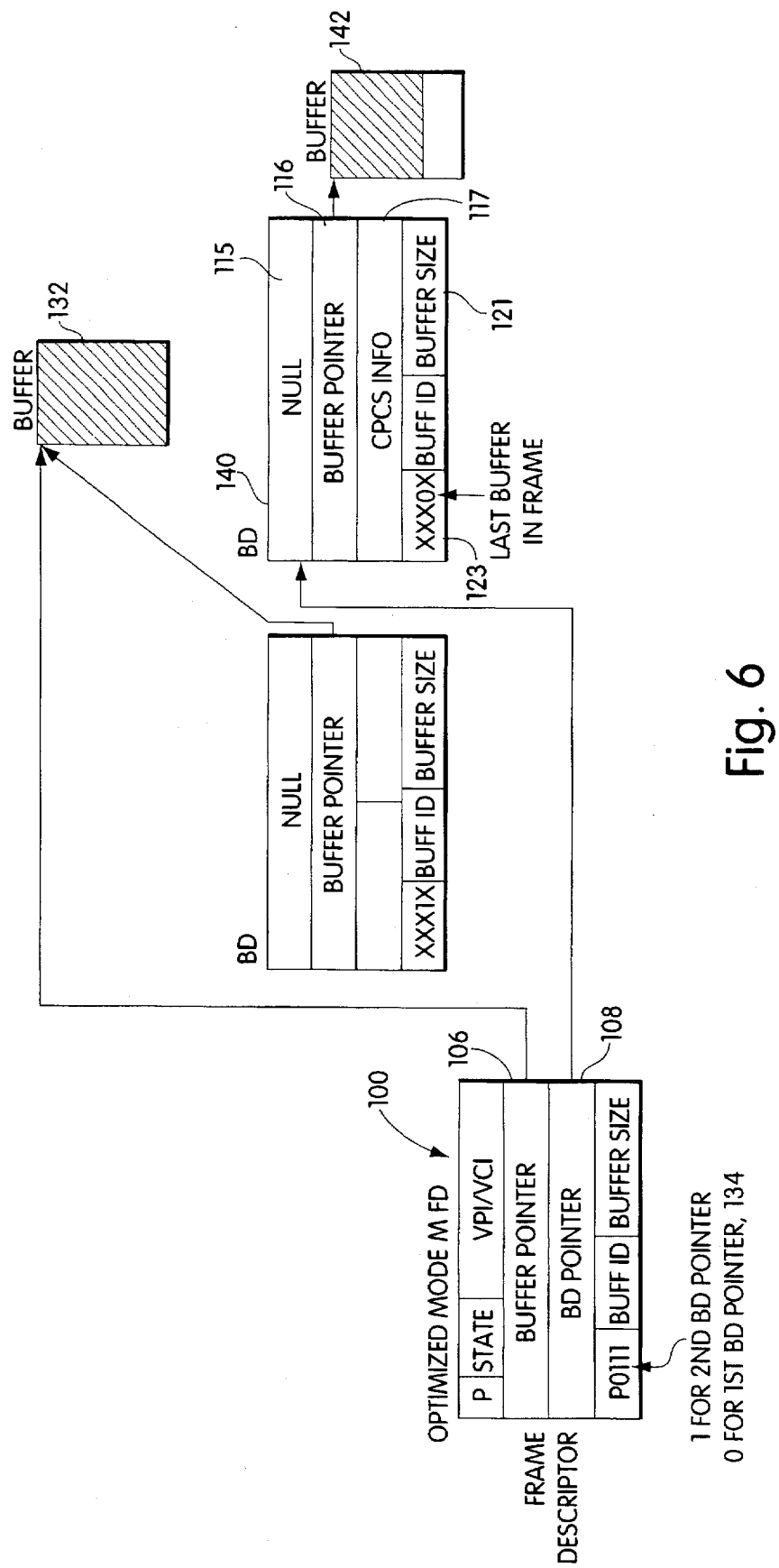
FIG. 6 is a diagrammatic illustration of additional optimization for the Mode M format yielding the Optimized Mode M format, in which a frame descriptor acts as the first buffer descriptor in the linked list to support chunking on the receive side.

FIG. 6 depicts an Optimized Mode M format in which frame descriptor 100 points directly to the first buffer in a link, namely buffer 132, while at the same time BD pointer 108 points to the second BD 140 and the linked list of the remaining buffers. This Optimized Mode M format eliminates the need for a BD for the first buffer since this BD is not read by the NIC. The second mode bit at 134 indicates whether the BD pointer in a FD points to the first or second BD in the frame. Ignoring data transfers, an Optimized Mode M frame requires a number of control operations equal to the number of buffers. For all but very small frames this is an insignificant reduction from Mode M in the number of PCI bus ops. However, this optimization enables chunking on the receive side as will be described later.

Figure 7:
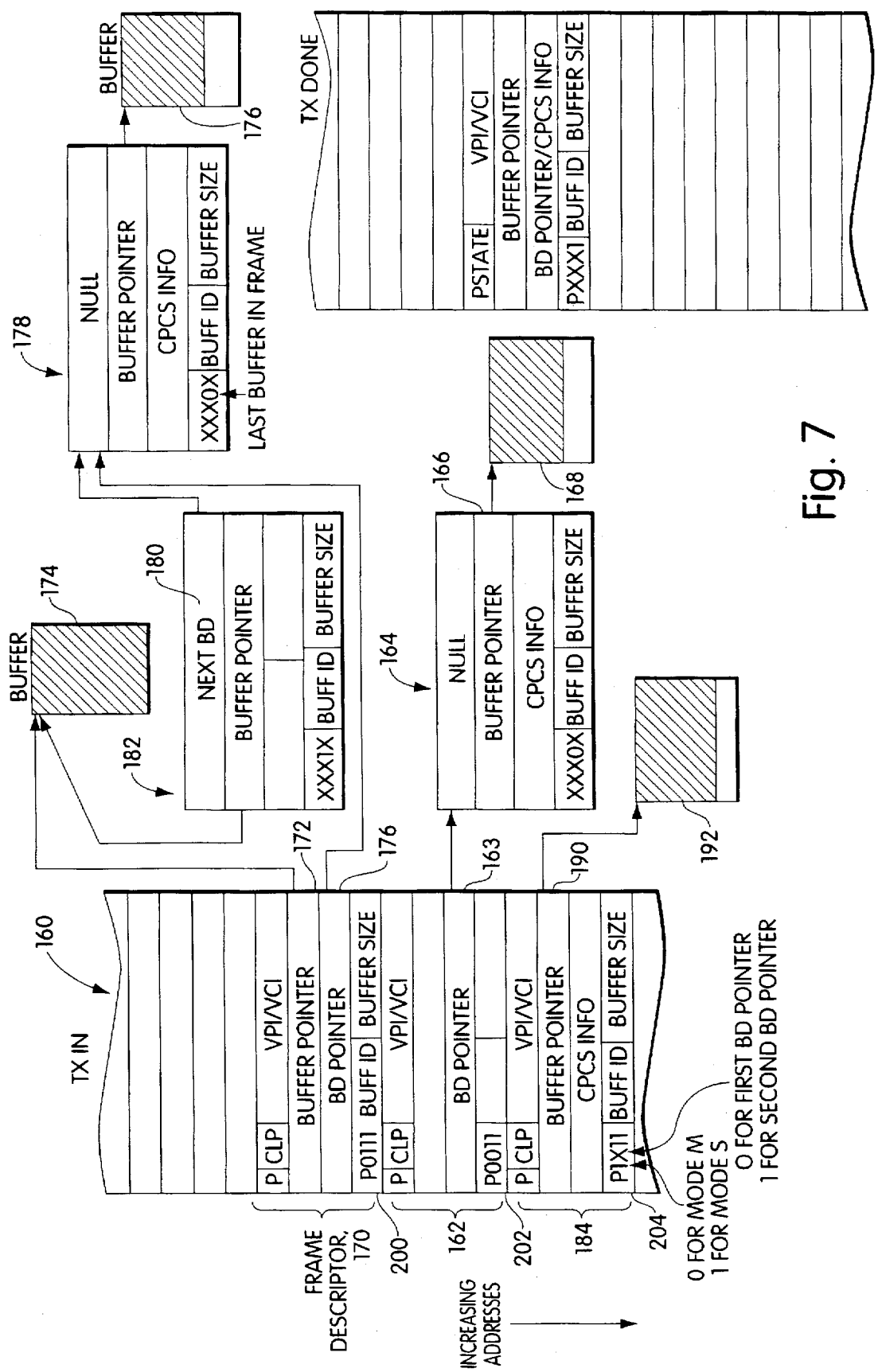
FIG. 7 is a diagrammatic illustration of transmit side queues and frame variations which support normal Mode M, Optimized Mode M, and Mode S formats.

FIG. 7 shows the transmit side and the different frame formats for the subject system with a TXin queue 160. Frame descriptor 162 shows unoptimized Mode M. BD pointer 163 points to buffer descriptor 164, with buffer pointer 166 pointing to a partially filled buffer 168.

Frame descriptor 170 shows optimized Mode M with the buffer pointer 172 pointing to a buffer 174 and with the BD pointer 176 pointing to a second buffer descriptor 178, with the next BD pointer 180 from buffer descriptor 182 pointing to buffer descriptor 178 as illustrated. Finally, frame descriptor 184 shows Mode S, with a buffer pointer 190 pointing to a partially filled buffer 192.

Of particular importance in the frame formats are the mode bits. The mode bits for Optimized Mode M are illustrated by reference character 200, the mode bits for Mode M format are illustrated at 202, and the mode bits for the Mode S format are illustrated at 204.

In each of the mode bit fields the first bit indicates whether the frame descriptor describes a Mode M or Mode S frame. The next bit indicates whether in the case of a Mode M frame, the buffer descriptor pointer points to the first buffer descriptor in the linked list of buffers or the second buffer descriptor in the linked list of buffers for this frame. The former indicates ordinary Mode M format, whereas the latter indicates Optimized Mode M format.

The next bit is utilized for streaming, where this bit indicates if the frame descriptor is the last frame descriptor for that frame or whether it is the non-last frame descriptor. This latter case indicates streaming of one or more frame segments to comprise the frame.

The last mode bit indicates that the frame transmitted is either an AAL5 frame or an AAL0 frame.

Thus it will be appreciated that the format utilized for the frame descriptors both specifies the format utilized and specifies whether chaining or streaming is to be applied. The frame descriptor format thus offers substantial flexibility in the way that frames are presented to and received from the network interface. For example, the frame descriptor format is very similar to the buffer descriptor format such that for instance in the Mode S format, buffer descriptor 114 is pushed into the frame descriptor, thus achieving the optimizations and efficiencies for small messages.

As will be described hereinafter the format of the frame descriptor shown in FIG. 7 supports chaining.

On the TX side, multiple frames for the same VC can be "chained" behind the same FD in TXin in one long linked list of BDs. The first BD for a frame contains everything required to describe a frame except for the VPI/VCI and the state. The FD contains the VPI/VCI, which is the same for every frame for the same virtual channel. The next BD pointer at the end of one frame points to the first BD pointer in the following frame. A mode bit indicates the end of a frame, i.e. last BD in a frame.

Figure 8:
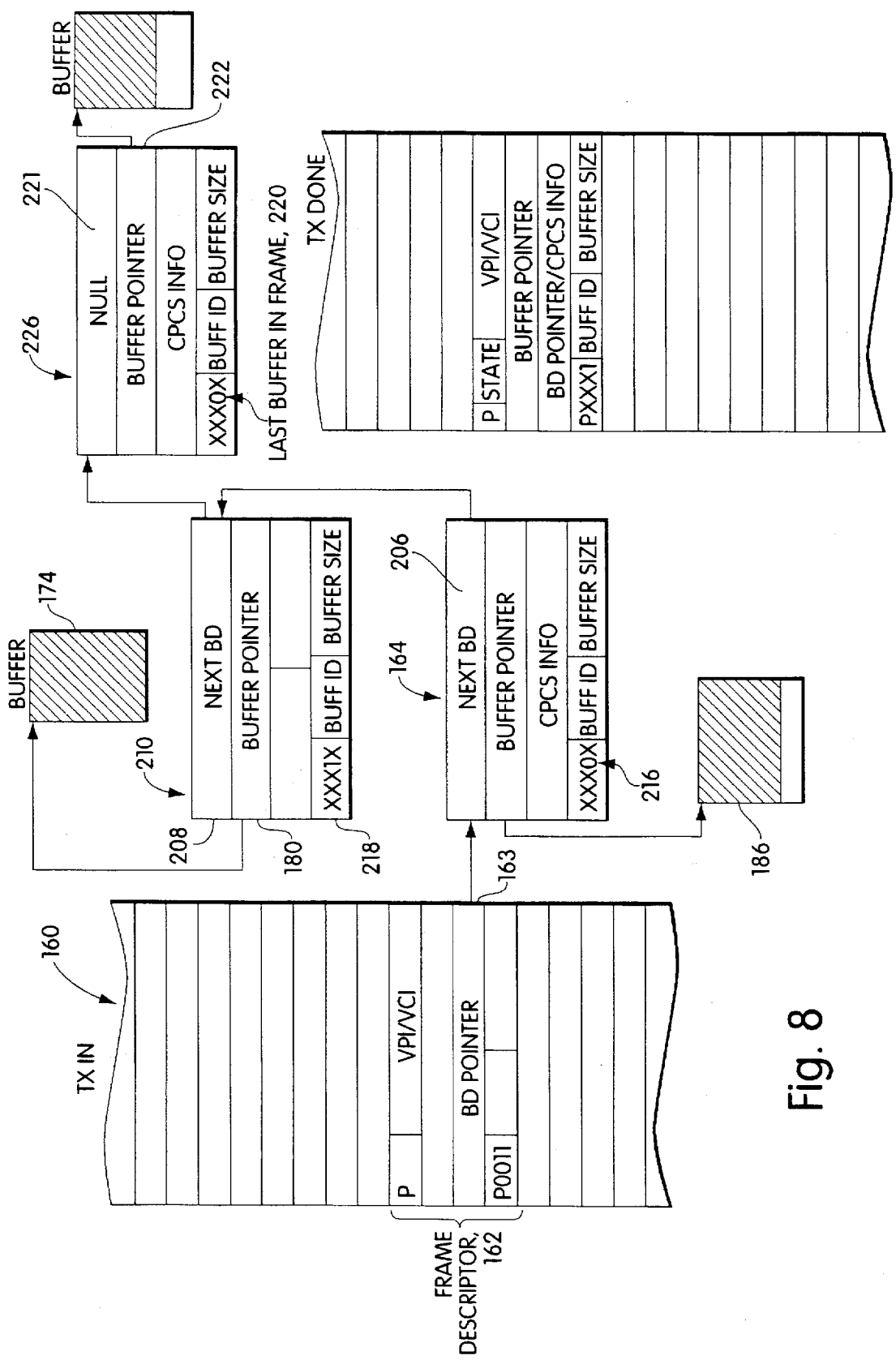
FIG. 8 is a diagrammatic illustration of the static chaining of frames.

FIG. 8 shows how the frame and buffer descriptor formats support static frame chaining, in which the host chains frames together before enqueuing them in the transmit input queue. The main purpose of such chaining is to allow the host system to transmit several frames in a single request to the NIC. Such chaining also reduces the likelihood of blocking.

Specifically, static chaining involves the utilization in the same Mode M format as described before in which frame descriptor 162 has BD pointer 163 pointing to buffer descriptor 164. Next BD pointer 206 points to the first buffer descriptor 210 of a following frame with its buffer pointer 180 pointing to buffer 174 and its third mode bit set at "1" as illustrated at 218. Many frames may be linked in such a way. The consequence is one long list of buffer descriptors containing multiple frames. The last buffer in a linked list of buffers for a frame is marked with the third mode bit set to zero as shown for the mode bits at 216 and 220. The linked list of buffers for the chain of frames is terminated with a NULL value 221 for the next BD pointer as shown in buffer descriptor 226. Note that although the first frame in a chain could be Optimized Mode M, all following frames in a chain must be Mode M. Also, note that a frame chain has only one FD, at the head of the list of BDs.

Figure 9:
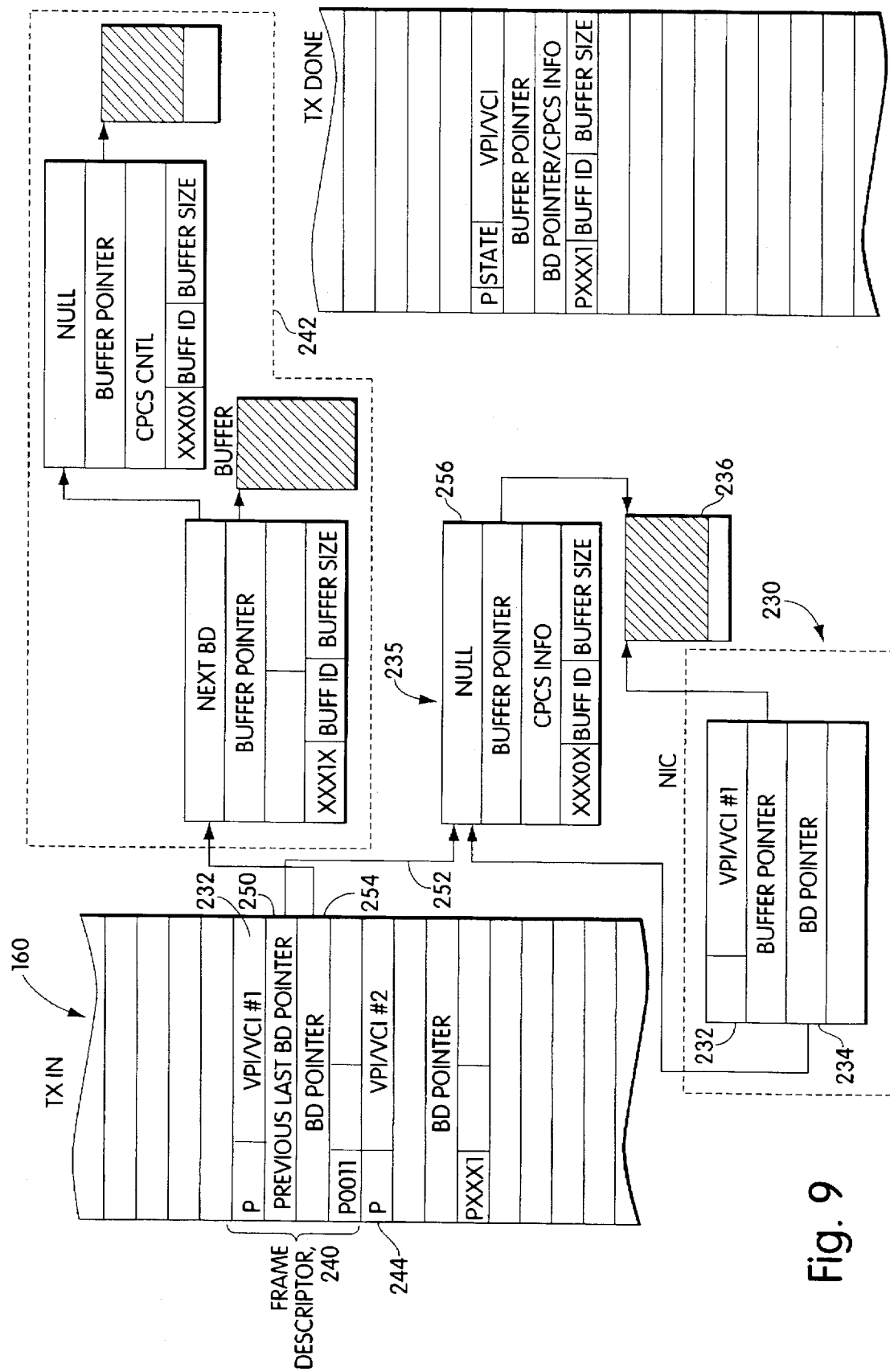
FIG. 9 is a diagrammatic illustration showing dynamic chaining.

The static frame chaining associated with FIG. 8 may be augmented to a dynamic frame chaining system as illustrated in FIG. 9. Dynamic frame chaining refers in general to the network interface chaining of frames together to achieve the same result achieved in the static chaining case. Static frame chaining must be performed by the host prior to insertion of the frame descriptor, the head of the linked list of frames, in the transmit input queue. In contrast, dynamic frame chaining consumes multiple frame descriptors from the transmit input queue and the network interface links them together to achieve the same end as in static frame chaining. In so doing the blocking problem referred to here before is completely solved. As described earlier, the blocking problem arises because a frame descriptor cannot be removed from the transmit input queue for the virtual channel which is already under transmission. In contradistinction, with dynamic frame chaining the network interface can dequeue a frame from a transmit input queue and chain it behind the linked list of buffers under transmission for the virtual channel.

In operation for dynamic chaining, the driver/application performs the following. First the application keeps a pointer, "prevpointer" or "previous last BD pointer", to the last buffer descriptor in the linked list for the most recently enqueued Mode M/optimized Mode M frame for the virtual channel. Secondly, the driver/application enqueues all subsequent frames in Mode M, allocating and using a buffer descriptor to convert Mode S and optimized Mode M to Mode M, with the second field of the frame descriptor containing the prevpointer to the last BD in the previous frame for that virtual channel.

FIG. 9 shows the situation just after the driver/application has enqueued such a frame descriptor in the TXin queue 160. The box at 230 shows the internal working registers of the network interface. In this case, 232 indicates that the network interface is currently transmitting a frame for a Virtual Channel #1, with a BD pointer 234 pointing to buffer descriptor 235, which in turn points to the buffer 236 currently under transmission. Meanwhile, the host has inserted at frame descriptor 240 information describing a frame illustrated by the dotted line 242 for the same virtual channel. If entry indicated at 240 is not removed, then blocking will occur because the following frame descriptor 2414 for Virtual Channel #2 cannot be removed from the transmit queue and thus will not be transmitted even if Virtual Channel #2 is presently idle.

In order to perform this dynamic frame chaining, the network interface performs the following functions. First, if the virtual channel is idle, the virtual channel is marked busy and the usual segmentation is performed. If the virtual channel is busy, then if the frame descriptor is not a Mode M frame descriptor or the frame PTI/CLP differs from that of the present frame, then the frame cannot be dynamically chained. At this point two options exist. First, the NIC can stall the transmit input queue or store the frame descriptor in an available network interface space; or it is possible to write out an error frame descriptor. Otherwise the network interface reads the previous pointer from the frame descriptor, namely, previous last BD pointer 250 which points to the last buffer descriptor in the previous frame as illustrated by arrow 252. If the network interface is still working on a previous frame and the current buffer descriptor pointer 234 does not equal the previous last buffer descriptor pointer at 250 then the network interface writes the BD pointer at 254 into the next BD pointer field in the last buffer descriptor pointed to by the previous last BD pointer 250, thus chaining the frame onto the end of the previous frame. In this case, the BD pointer field 254 is copied into the current NULL field 256 of BD 235.

Otherwise, if the network interface is working on the last buffer descriptor of the previous frame, then the network interface stores the buffer descriptor pointer 254 into buffer descriptor pointer 234.

Next, transmit side streaming is described. Streaming refers to allowing a frame to be delivered or received from the network interface as a series of frame segments. On the transmit side each frame segment is one or more buffers in the Mode M format with a frame descriptor in the TXin queue. On the receive side each frame segment is one buffer in Mode S or more buffers in Mode M with a frame descriptor in the receive TXdone queue. The number of buffers per frame segment is controlled by a register segsize. One or more of these frame segments makes an entire frame. A mode bit in the frame descriptor indicates if a frame segment is the last such segment in the frame. If so, it will contain the AAL5 information.

Since streaming allows a frame to be delivered to or received from the network interface as a series of frame segments, this helps reduce the latency in processing frames because on the transmit side the NIC can start transmission of a frame before all of the segments are generated and on the receive side the frame processing can start before the entire frame is received. Also on the transmit side, streaming allows buffers to be recycled before the end of the frame.

Figure 10:
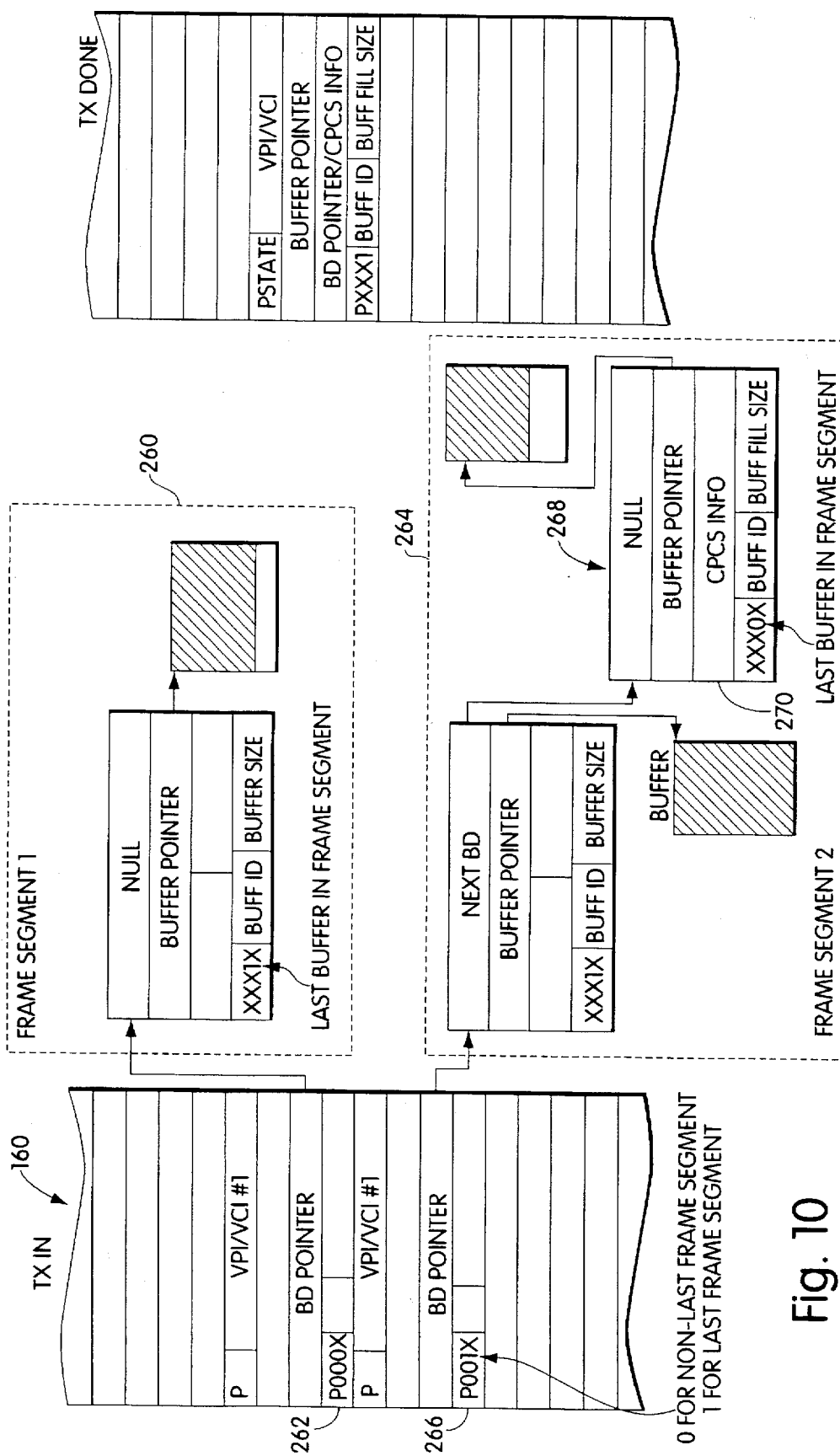
FIG. 10 is a diagrammatic illustration showing dynamic frame streaming on the transmit side.

FIG. 10 illustrates transmit side streaming. The transmit input queue 160 contains one or more Mode M format linked list of buffers, each of which provides a segment of the frame. The dotted line 260 in FIG. 10 shows one frame segment of linked list of buffers in Mode M. The third mode bit 262 in the frame descriptor indicates that this is the non-last frame segment of a frame. There may be zero or more of these types of frame segments eventually followed by a last frame segment as shown within dotted line 264. This is, once again, a complete linked list of buffers in Mode M format. However, now the third mode bit at 266 indicates that this is the last segment of the frame for this particular virtual channel. In this special case, the last buffer descriptor 26(8 contains CPCS information in field 270. In operation, TX side streaming does not require major implementation. Rather, it heavily exploits buffer change detection in a Mode M frame and dynamic frame chaining. Streaming requires a minor change in dynamic frame chaining and one addition to write out frame descriptors to allow buffer recyling.

Segmentation proceeds until the end of the frame or until there is less than 48 bytes of data in the current buffer. A full cell payload of data must be acquired before segmentation can proceed. In the non-streaming case, the NIC reads the next BD pointer and then performs two I/O bus operations, one to read the last partial cell from the current buffer and one to read the rest of the cell from the new buffer. In the streaming case, if the next BD pointer is NULL, segmentation stalls until the next frame segment appears in TXin since the last partial cell of the current segment cannot be fetched by the NIC until the next frame segment for that virtual channel is loaded. When the next frame segment does appear and is fetched from TXin, the next BD pointer from the FD is stored in the next BD pointer field in the VC entry. At this point, the situation is the same as for a buffer change and segmentation may resume.

Frame segments may be dynamically chained just like for frames. However, a subtle problem arises. If two complete frames are chained when the NIC is segmenting the last buffer of the first chain, there is actually no need to update the next BD field in memory of the last BD of the first frame. It suffices to just store that BD pointer in the next BD field in the VC table. However, if two segments for the same frame are chained under these circumstances, the second segment will not be linked into the list headed by the FD written to TXdone. Consequently, buffers can become lost. The solution is very simple: update the next BD field in memory whenever the segment is not the last in a frame.

To allow the stated advantage of faster buffer recyling to be achieved by streaming, the most significant bit, the P bit, in the last word of a BD can be set to indicate when to write a FD to TXdone. After completing a buffer change, and completely sending any cell crossing a buffer boundary, the NIC checks this bit, and if set, writes a FD with non-last frame segment bit to TXdone for the buffers transmitted to that point and updates the head pointer in the VC table entry. Since the BD has just been read, this bit and the new head pointer can be stored in working registers and no new VC table entry fields are required.

Figure 11:
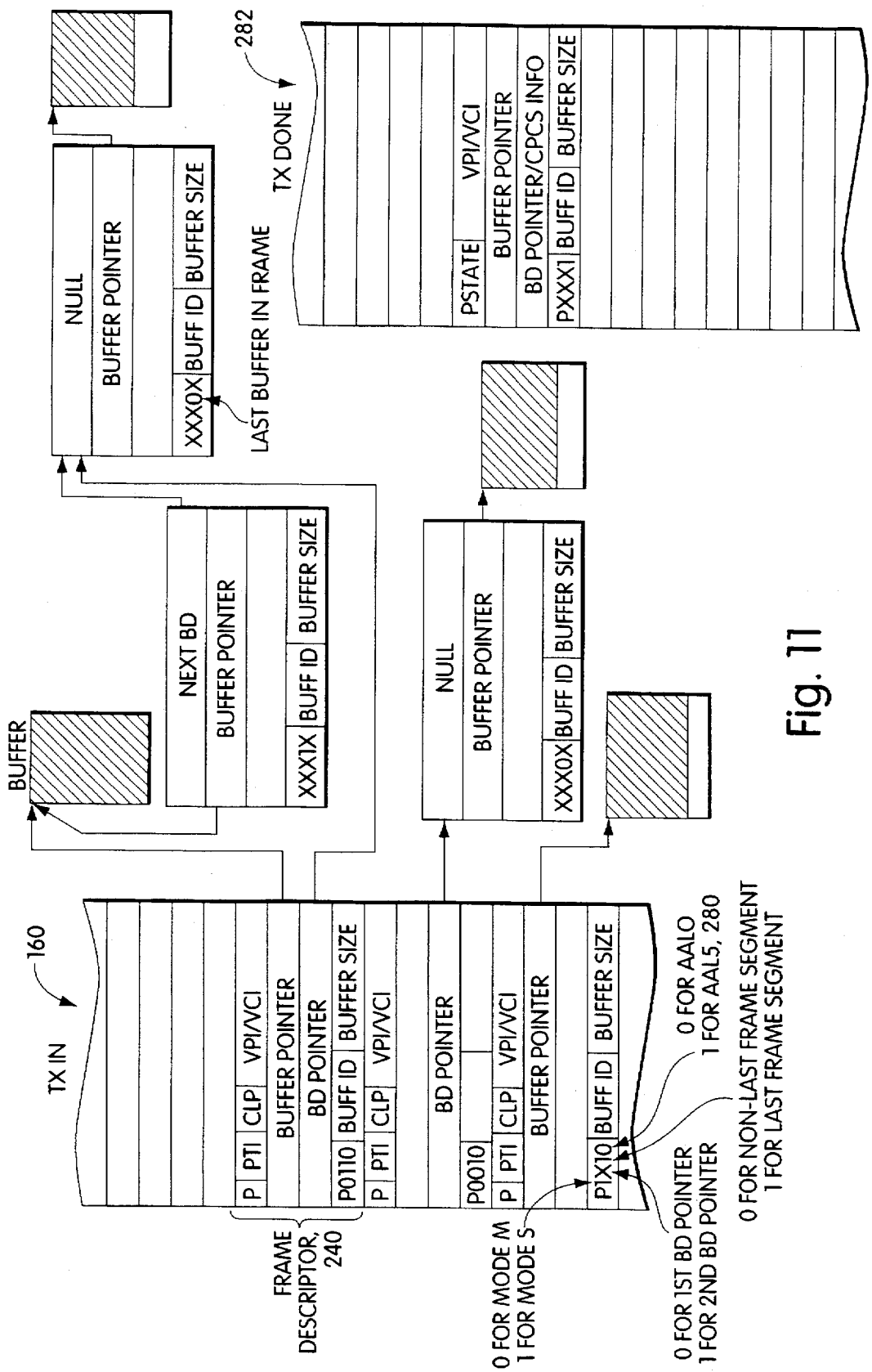
FIG. 11 is a diagrammatic illustration showing a summary of the various frame formats on the transmit side for AAL0 variations.

FIG. 11 shows slight variations with respect to the formats shown in FIG. 7 to support AAL0 format, also known as the null adaptation layer, or raw cells. There are two reasons to allow such a raw cell mode in which application contribute 48 byte units for direct inclusion in ATM cells. The first reason to allow such raw mode cells is payload transparency. Payload transparency refers to permitting any format for the data in the payload, i.e. not necessary AAL5 format. This may be used directly by applications. The second reason to allow such raw mode cells is cell-transparency, which refers to arbitrary values for PTI, CLP, and GFC in the cell headers as well as cell payloads. PTI refers to payload type indicator field, CLP refers to cell loss priority and GFC refers to generic flow control, all of these being in the ATM cell header as shown in FIG. 1C.

The operation of AAL5 and shaped AAL0 modes is as similar as possible. Both modes use the same queues, namely the TXin queue, the TXdone queue, the RXfree queue and the RXdone queue. FIG. 11 shows various modes and the frame descriptor and buffer descriptor formats possible for the AAL0 format on the transmit side. The fourth mode bit, at 280, of the frame descriptor controls the AAL5 format versus the AAL0 format. Consequently the frame descriptor format can describe either the AAL0 mode or the AAL5 mode with the requisite flexibility without disturbing the fields which support the AAL5 formal;. As an example, this enables the AAL5 and the AAL0 frames to be interspersed for a single virtual channel. The frame descriptor format differs from that for the AAL5 format only in that the most significant byte of the first 32 bit field in the frame descriptor contains the PTI in addition to the CLP. The GFC field in the ATM cell header is normally O. A variety of options exist for encoding the GFC field in the frame descriptor if desired. For example, the GFC bits may be encoded in the 4 least significant bits of the buffer ID. The PTI, CLP, and GFC values are not returned in the frame descriptors in the TXdone queue.

In each of the AAL0 modes, the given buffer is segmented into 48 byte units and sent as individual AAL0 cells, all with the same GFC, PTI, and CLP. As will be seen, this corresponds to transmit side chunking. If the combined buffer sizes are not a multiple of 48 bytes, then the cell send is aborted and an error status indicated in the frame descriptor is written out to the TXdone queue here illustrated at 282.

Figure 12:
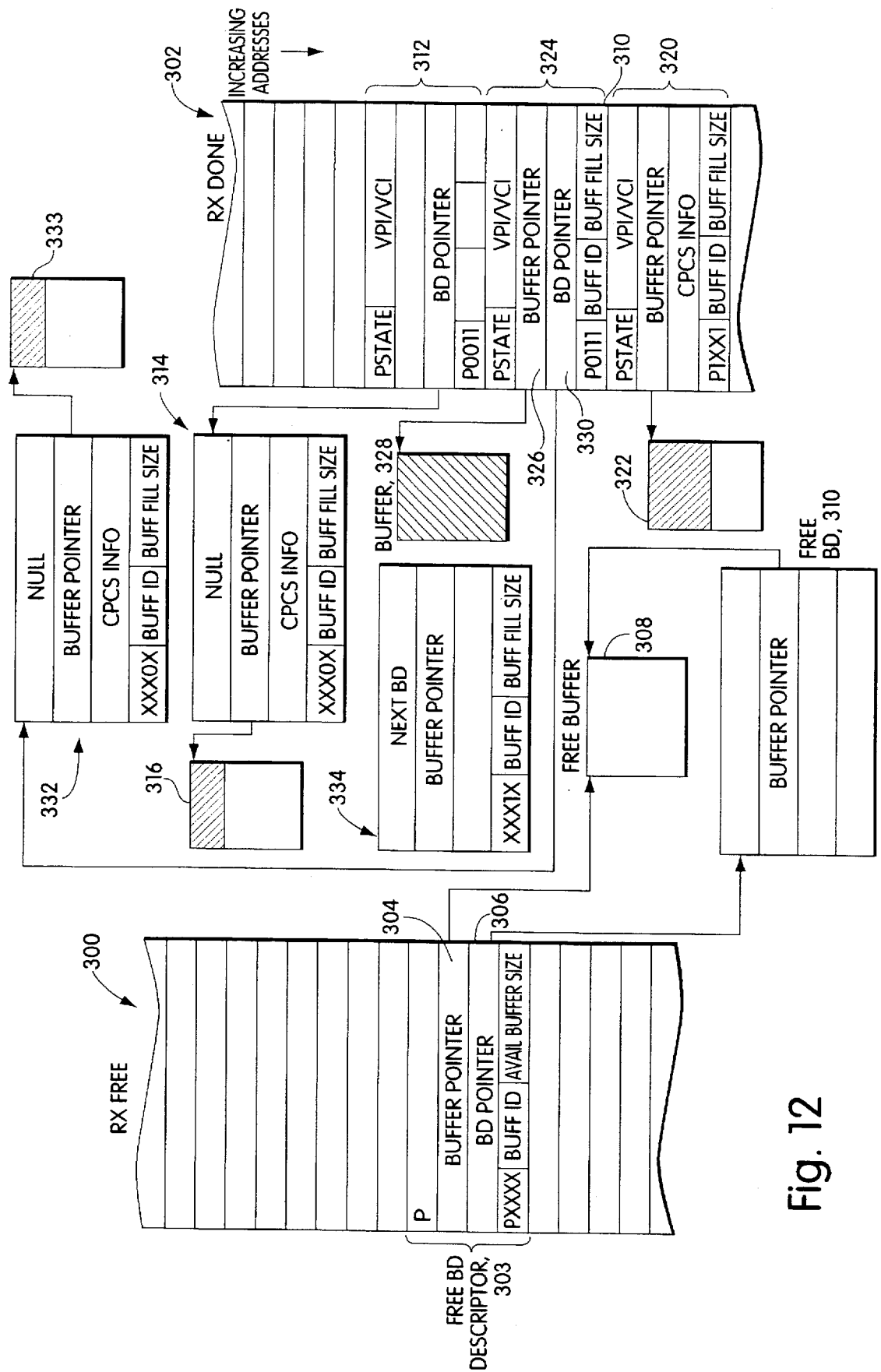
FIG. 12 is a diagrammatic illustration of the various frame formats on the receive side for AAL5 with free buffer queue labelled RXfree.

FIG. 12 shows the receive side including RXfree queue 300 and RXdone queue 302 along with the different buffer modes permitted with the subject system. Entries in the RXfree queue 300 are free BD descriptors, FBD, such as at 303, with a very similar structure to frame descriptors, including two present bits. Each FBD 303 contains pointers 304 and 306 which respectively point to a free buffer 308 and a free buffer descriptor 310. This unique organization means only one ring queue is necessary and only one I/O bus access is required to provide incoming frames with the necessary free structures per required buffer. The actual entries in the RXfree queue are FBDs, directly allocated in the ring queue and thus they cannot be used for constructing linked lists.

FIG. 12 shows the various formats possible on the receive side. Frame descriptor 312 is Mode M format. It points to a linked list of buffer descriptors, one of which is shown at reference 314 which in turn points to buffer 316.

Frame descriptor 320 illustrates Mode S. Frame descriptor 320 points to a buffer 322. Frame descriptor 324 illustrates optimized Mode M. FD 324 has a buffer pointer 326 which points to the first buffer at buffer 328. The BD pointer 330 points to buffer descriptor 332 which in turn points to the second buffer 333. Though not shown here, BD 332 may also point to a further BD, and so on. Note that buffer descriptor 334 obtained from the same RXfree buffer descriptor entry as buffer 328 is not used. This has advantages to be described later in reference to chunking.

As can be seen, FIG. 12 shows all three of the formats, namely Mode M, Mode S and optimized Mode M, for AAL5 frames with no buffer chunking. Upon arrival of a new frame the network interface dequeues a frame buffer descriptor from the RXfree queue 300 and extracts from FBD 340 a free buffer pointer 304 and a pointer 306 to a free buffer descriptor, 310. If the frame fits in that single buffer, the free buffer descriptor 310 is ignored and the frame descriptor points directly to the buffer yielding a Mode S frame. If the frame does not fit in a single buffer, then multiple buffers are linked together using free buffer descriptors and the frame descriptor points to the first buffer descriptor in the lists The resulting frame can be either Mode M or an optimized Mode M depending on virtual channel enable bits. The discarded free buffer descriptor in Mode S and and optimized Mode M needs to be reclaimed as described later.

In conventional network interfaces, a new buffer is retrieved when a new frame arrives, or when the received frame fills the present buffer. The last buffer in a received frame may be mostly empty. In contrast, with buffer chunking multiple frames can be stored in a buffer with a new buffer being retrieved only when a buffer fills. The buffer region used for storing a received frame is divided into what are called chunks. Each chunk is a buffer or less in size and contains the part of the frame that fits entirely within a buffer. A small frame may require only a single chunk, but a large message frame may require a first chunk less than a buffer in size, then a chunk equal to a full buffer, and then a chunk less than a full buffer in size.

Figure 13:
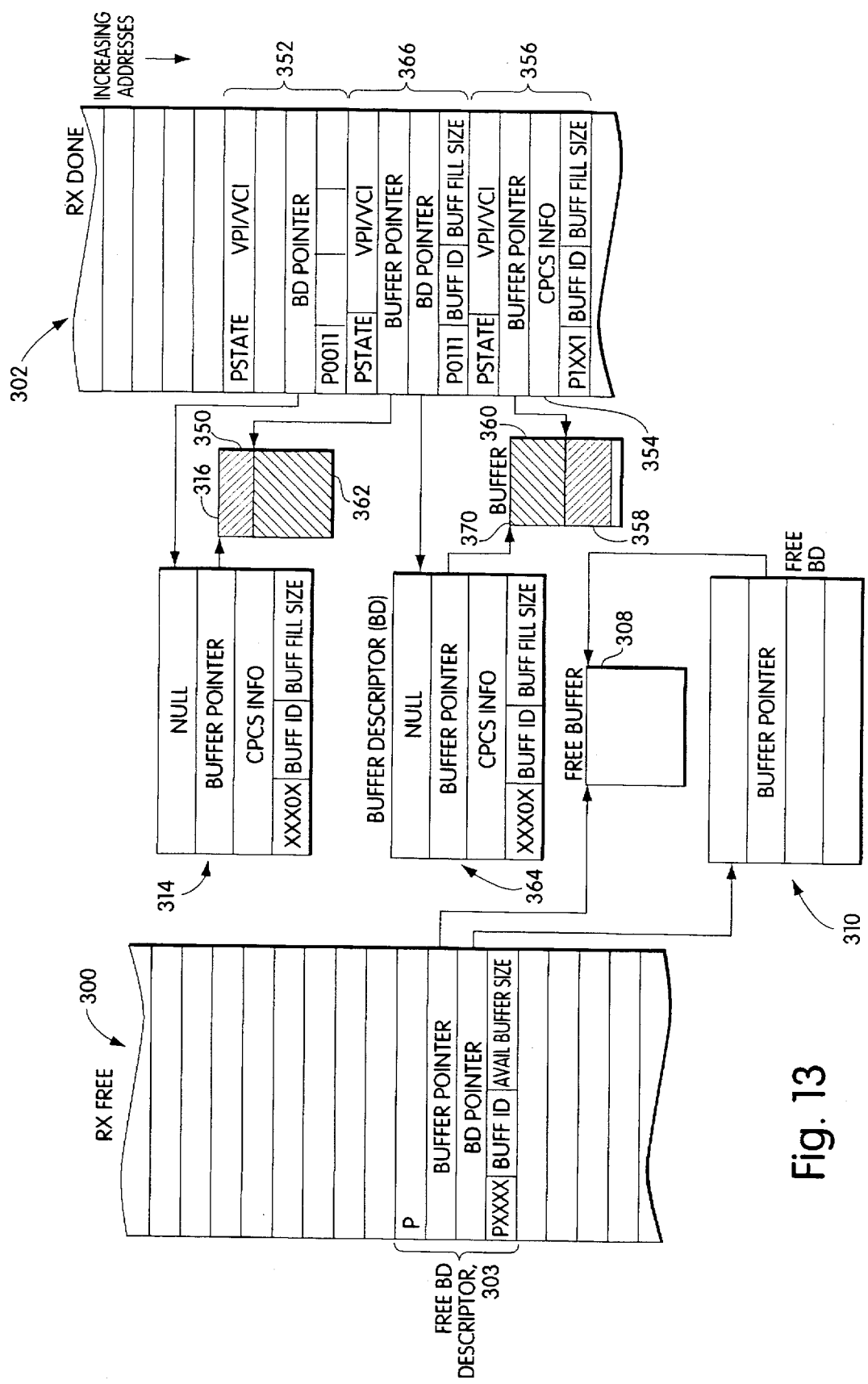
FIG. 13 is a diagrammatic illustration of receive side variations to accommodate chunking for the AAL5 format, showing the same type of flexibility as the system shown in FIG. 12, but also accommodating chunking; and, FIG. 14 is a diagrammatic illustration of the receive side for the AAL0 format with chunking.

FIG. 13 shows the same three frame formats for AAL5 with buffer chunking. Upon arrival of a new frame at the network interface, the network interface dequeues a FBD 303 from the RXfree queue 300 only when there is no space left in the previous buffer. There are two cases which arise. The first case is that the buffer has not yet been used, for example, a FBD has just been dequeued. The first chunk in the buffer that is not used is shown by reference character 350. Here, there is a choice. Either the first chunk in the frame can be represented using Mode M as illustrated at 352 in which a buffer descriptor pointer 354 points to buffer descriptor 314 which points to the chunk 350. Alternatively, the first chunk can be represented using Mode S, yielding the advantage of low overhead since there is no buffer descriptor to access. In the case of Mode S, frame descriptor 356 points directly to chunk 358. However, as will be described this has the disadvantage that the free buffer descriptor discarded must be reclaimed. Bits in the virtual channel table indicate if chunking is enabled and if so which of the choices above is used.

The second case is that a portion of the buffer has already been used for a previous frame, as by illustrated by chunk 350 in buffer 316. If the new frame fits into a single chunk, no free buffer descriptor is required. Then the buffer descriptor is allocated directly in the RXdone queue 302 corresponding to a frame descriptor, and points directly to the chunk, yielding a Mode S frame. Note Mode S is mandatory here because Mode M format would require another free buffer descriptor from some place.

If the new frame does not fit in the remaining buffer area as illustrated at 362, then multiple chunks are linked together using free buffer descriptors. In this case the first chunk must use optimized Mode M. For every chunk thereafter the network interface must dequeue a FBD to obtain a free buffer and a free buffer descriptor. Thereafter the NIC uses free buffer descriptors for successive buffer descriptors in the listed list of buffer descriptors.

For example, frame descriptor 366 points to a first chunk at 362 and a BD at 364. This BD then points to a second chunk at 360.

As mentioned before, reclaiming of the unused buffer descriptor spaces is important. One free buffer descriptor is supplied per buffer in the RXfree queue. As described above, there are cases where the buffer descriptor is not required. These orphaned free buffer descriptors must be reclaimed so that they can be recycled.

One way to reclaim orphaned buffer descriptors is to find the buffer descriptor with the same buffer pointer as in the frame descriptor. For the non-chunking mode, any Mode S frame has an associated orphaned buffer descriptor. For the chunking mode, the driver/application waits until the last chunk of a buffer appears in a frame in the RXdone queue. This requires keeping a running total of buffer usage, and this must be done as part of chunk recombining in any event. At this point the driver/application can recombine the chunks back into the buffer. The buffer descriptor associated with this buffer can be found as before. In this scheme a data structure maps from buffer address to buffer descriptor. This, in one embodiment:, is a hash table or a simple table if buffers are page aligned and spans a small range of addresses. In the case of multiple virtual channels sharing an RXfree queue, each virtual channel must take an entire buffer to chunk for that virtual channel. Another way to reclaim orphaned buffer descriptors is to use the buffer ID field in the frame descriptor as an index into a table of buffer descriptor addresses.

With respect to streaming on the received side, the RX side has a virtual channel table entry a segsize, on a per virtual channel basis, specifying the frame segment size in terms of the number of buffers, e.g. buffer descriptors. Reassembly proceeds until this number of buffers have been filled, or the end of a frame, and then a frame descriptor is written out to the RXdone queue. If optimized Mode M is used for the segment, then there is no difference in overhead in writing a frame descriptor for frame segment and writing a buffer descriptor for the buffer change.

Figure 14:
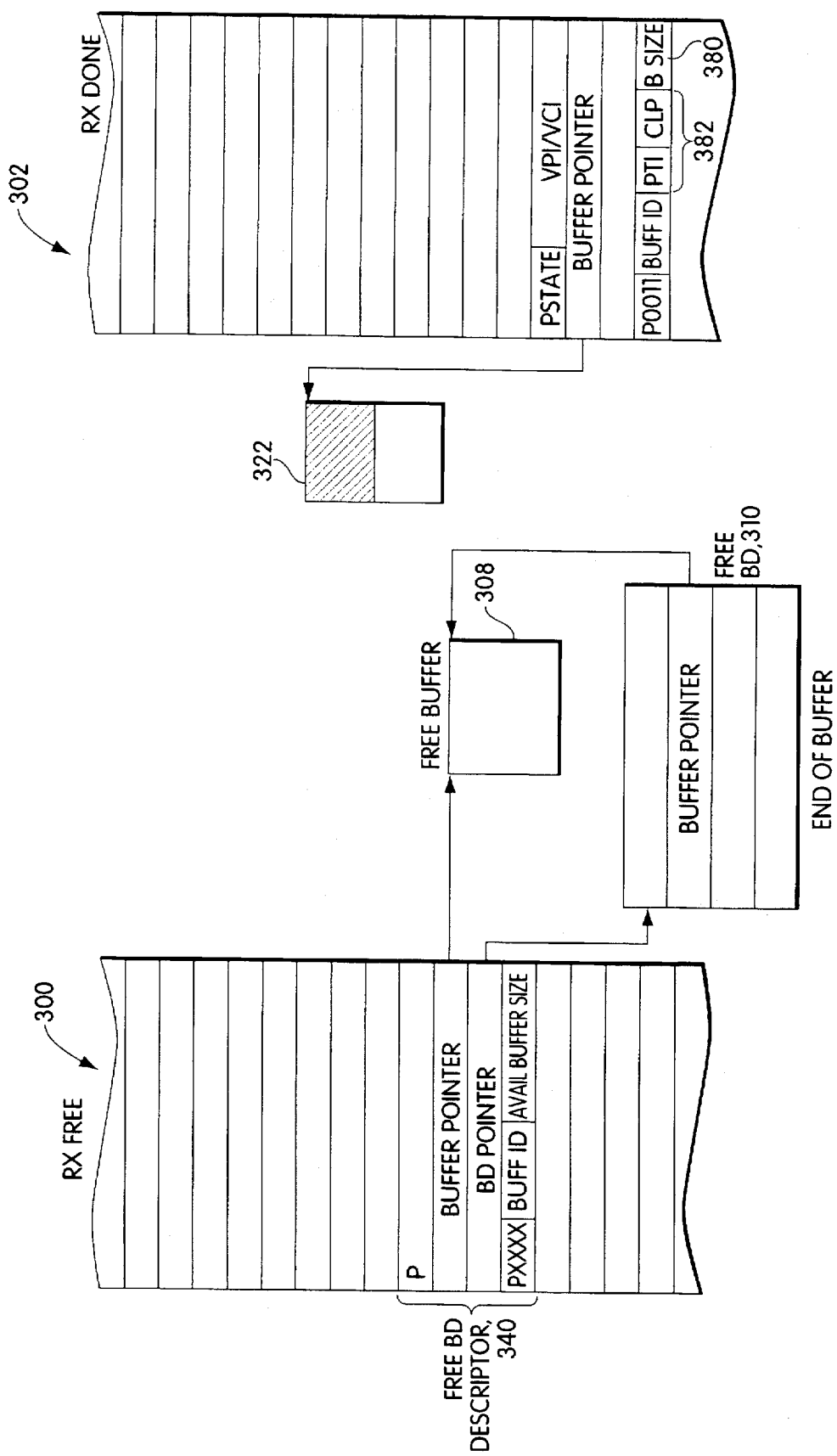

FIG. 14 shows how the receive side supports AAL0 mode. In the receive direction, each virtual channel is marked as always in the AAL0 mode or the AAL5 mode. If in the AAL0 mode, each incoming cell for that virtual channel is written into a buffer and a Mode S frame descriptor containing the cell header and the AAL0 bit set is written into the RXdone queue. Either the non-chunking mode or the chunking mode may be used.

The only difference between the AAL0 and AAL5 modes on the receive side is that the buffer fill size entry 380 as illustrated in FIG. 12 has its upper 4 bits replaced by the PTI and CLP fields from the head of the last cell as at 382. The result is that the only difference in format between the AAL5 mode and the AAL0 mode is that in the AAL0 mode, a four bit concatenation of the PTI and CLP field from the header of the last cell is written to the most significant byte of the buffer side field in the frame descriptor in the RXdone queue. In the AAL0 mode, the buffer size is never bigger than 48 bytes, so there is no conflict. If desired, the GFC field may also be included in the frame descriptor. There are a variety of ways to accomplish this. One way is to store the GFC field from an incoming cell into 4 bits of the buffer size field adjacent to the PTI and CLP.

As will be described algorithms for accomplishing the above functions are now presented.

On the transmit side, the NIC keeps at least the following information for each virtual channel:

mode bits current buffer pointer buffer size left current BD pointer pointer to first BD in frame segment The operations involved in sending data are generally as follows:

1. The driver/application stores a message in linked list of BDs
   a. find free buffers and fill with data
   b. after first buffer filled, find a free BD per buffer and fill in with buffer descriptor. (It will be convenient to manage buffers and BDs as pairs.)

2. The driver/application enqueues an entry in TXin: either a FD in Mode M, a copy of the first BD (with the VPI/VCI in the first field) in Mode S, or a FD in optimized Mode M.

3. The driver/application notifies the NIC (possible methods are via NIC polling, or by directly writing notification status register).

4. The NIC dequeues FD entry from TXin and stores FD information.

5. If Mode S: NIC reads buffer. If Mode M: NIC read BD and then reads buffer. Repeat as necessary until last buffer sent (as indicated by last field in BD). If next BD pointer is non-NULL, then it points to the first BD of another frame of frame segment for the same VC. Keep processing frames/segments until next BD pointer is NULL.

If optimized Mode M: NIC reads first buffer and thereafter follows procedure for Mode M.

6. The NIC enqueues an entry in TXdone for each frame segment sent:
   a. if non-chained or the first frame in a chain, write a FD to TXdone and update state (based on information saved from FD in TXin)
   b. if chained, write a Mode M FD to TXdone.
7. The driver/application dequeues the FD from TXdone and reclaims buffers and BDs.

On the receive side, the NIC keeps at least the following information for each virtual channel:
   mode bits
   current buffer position
   a "chunk" pointer giving the current chunk position in the current buffer. This pointer is used for "chunking" the buffer, i.e. allocating storage for consecutive frames in consecutive chunks out of the same buffer.
   buffer size left The operations involved in receiving data are generally as follows:

0. (In advance) Driver/application prepares RXfree by enqueuing sufficient number of FBDs. In practice, to enqueue a FBD, host will will one free BD in memory with an associated buffer.
1. When the first cell or a frame arrives, the NIC examines VC table entry.
2. If the chunk pointer is NULL or chunking is disabled, the NIC dequeues a FBD from RXfree and updates the chunk pointer to the buffer pointer in the FBD.
3. The NIC reassembles incoming frame into buffer indicated by chunk pointer.
   a. Store data in current buffer.
   b. If frame done (Mode S), then write out a FD to RXdone Options: if non-chunking mode or if chunking mode and first chunk in buffer, then could write out mode M FD.
   c. If frame not done (buffer filled) (optimized Mode M), then
      i. Dequeue a new FBD from RXfree and obtain a new buffer and free BD pointers
      ii. store data in new buffer
      iii. if frame done, when write out a BD to location in new free BD pointer with
   buffer pointer set to buffer pointer
   next BD pointer set to NULL
      iv. otherwise:
   store free BD pointer in temporary register "saved BD"
   store pointer to first buffer in temporary register "saved buffer pointer"
      V. dequeue a new FBD from RXfree and obtain new buffer and free BD pointers
      vi. write out a BD to location in saved BD with
   buffer pointer set to saved buffer pointer
   next pointer set to new free BD pointer
      vii. go to (ii)
   Options: if non-chunking mode or if chunking mode and first chunk in buffer, then could write out Mode M FD.
4. The NIC writes a FD to RXdone.
5. The NIC notifies driver/application (possible methods are via interrupt or the driver/application polling).
6. Driver/application dequeues FD from RXdone and processes frame.

The operations for dynamic chaining are as follows. Both the driver/application and the NIC play roles.

The driver/application does the following:
1. keeps a pointer, "prev pointer", to the last BD in the linked list for the most recently enqueued Mode M frame for the VC
2. enqueues all frames in mode M (allocating and using a BD to convert Mode S to Mode M) with the second field of the FD containing the prev pointer.

The NIC does the following:
1. if the VC channel is idle, mark VC busy and perform usual segmentation
2. if the VC channel is busy, then:
   a. if the FD is not Mode M or the frame GFC/PTI/CLP differs from that of the present frame, or the prev pointer in the FD is NULL, then the frame cannot be dynamically chained. In this case, further processing of TXin is stalled until the current segmentation for the VC channel completes, leading to possible blocking. (Another possibility is to write the frame out to TXdone with the FD indicating an error.)
   b. otherwise:
      i. if still working on previous frame and either:
   current BD pointer does not equal previous last BD pointer, or the VC table entry has last frame segment bit off then:
   write BD pointer from FD into the next BD field in last BD in previous frame (thus chaining the frame onto the end of the previous frame)
      ii. if working on last BD of previous frame or now done with previous frame
   store BD pointer into next BD field of VC table entry
3. when finish a frame, check the next BD field in VC table entry. If non-null, then next BD is the first BD in the next chained frame; load it and process it.

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. In a connection-based data transmission system a network interface for connecting a host computer to a network over a virtual connection, comprising:
   a network interface card having a Peripheral component interconnect interface, a receive block and a transmit block connected thereto, a bus connecting said peripheral component interconnect interface to said computer and means for connecting said transmit block and said receive block to said network, said host computer having TXin and TXdone queues and RXfree and RXdone queues; and,
   means within said RX and TX blocks for implementing a multiword frame descriptor format utilized by said queues and said peripheral component interconnect interface a mode description in said frame descriptor specifying one of a plurality of different modes such that said frame descriptor accommodates Mode M, Mode S and Optimized Mode M.

2. The system of claim 1 wherein said multiword frame descriptor format includes a field to accommodate a Mode S format.

3. The system of claim 1 wherein said multiword frame descriptor format supports a Mode M format.

4. The system of claim 1 wherein said multiword frame descriptor format supports an Optimized Mode M format.

5. The system of claim 1 wherein said multiword frame descriptor format supports chaining.

6. The system of claim 1 wherein said multiword frame descriptor format supports streaming.

7. The system of claim 1 wherein said multiword frame descriptor format supports chunking.

8. The system of claim 1 wherein said network interface card includes a local memory, wherein said queues are located in said local memory and wherein said multiword frame descriptor includes a field having dual present bits to permit the same format for frame descriptors regardless of whether the system is addressing an input or output queue or whether said queues are in said host memory such that said network interface card always accesses said frame descriptor in the same linear access order regardless of whether said frame descriptor is in an input or output queue or whether said frame descriptor is in local or host memory.

9. The system of claim 1 wherein interface is an ATM interface and wherein said multiword frame descriptor format has a field to accommodate both the AAL0 and AAL5 formats.

10. The system of claim 1 wherein said network interface card includes means for preventing blocking including means for dynamically chaining a frame in TXin onto the end of a chain of frames presently undergoing transmission for the same virtual connection, said means for dynamically chaining including means for providing in said frame descriptor a previous last buffer descriptor pointer and means upon detecting a blocking condition for said TXin queue for removing said frame descriptor from TXin and writing said buffer descriptor Pointer contained in said frame descriptor at the address indicated by the previous last buffer descriptor Pointer contained in said frame descriptor.

11. The system of claim 1 wherein a number of frames are undergoing transmission for the same virtual connection and wherein said RXfree queue has a frame descriptor containing a buffer pointer to an associated buffer descriptor having similar format to that of said frame descriptor.

12. The system of claim 11 wherein said frame descriptor for said RXfree queue and said buffer descriptor are combined into one descriptor.

13. A network interface for the transmission of frames of information from a host computer over a network, said interface having one or more buffers, a linked list of buffers, and a multiword frame descriptor to indicate either a single buffer or the head of said linked list of buffers, with each of the buffers in said linked list of buffers having its own buffer descriptor said frame descriptor including a mode designation specifying one of a Plurality or different modes such that said frame descriptor accommodates Mode M, Mode S and Optimized Mode M.

14. The network interface of claim 13 wherein the formats of said frame and buffer descriptors are such as to permit static chaining, dynamic chaining and streaming, all from the same descriptor format.

15. The network interface of claim 13 including a TXin queue and means including said frame descriptor to identify frames to be sent over said network including means for an application to write a frame descriptor directly into said TXin queue without driver or operating system intervention, thus to enable said frames to be identified for transmission without said intervention.

16. The network interface of claim 15 wherein said means to identify said frames includes ring queues containing said multiword frame descriptor, with said frame descriptor including a pointer to said buffer or a pointer to the head of said linked list of buffers.

17. The network interface of claim 16 wherein said frame descriptor includes information describing said frame and wherein said information includes at least one of virtual channel number, state information and mode indication, thus to provide a multiword frame descriptor constituting a fat pointer to frame data.

18. The network interface of claim 17 wherein said frame descriptor points to the buffer descriptor for the first buffer in said linked list, and that points to the next buffer descriptor for the next buffer in said linked list.

19. The network interface of claim 13 wherein said host computer has a driver and an operating system, and said network interface has a transmit input queue and further including means for writing a frame descriptor directly into said transmit input queue, thus to eliminate intervention by said driver or operating system.

20. A network interface for the transmission of frames of information from a host computer over a network, said interface having one or more buffers, a linked list of buffers, and a multi-word frame descriptor to indicate either a single buffer or the head of said linked list of buffers, with each of the buffers of in said linked list of buffers having its own descriptor buffer, the formats of said frame and buffer descriptors being such as to permit static chaining, dynamic chaining and streaming, all from the same descriptor format.

21. In a connection-based data transmission system, a network interface for connecting a host computer to a network comprising:
   a network interface card having a peripheral component interconnect interface, a receive block and transmit block connected thereto, a bus connecting said peripheral component interconnect interface to said host computer and means for connecting said transmit block and said receive block to said network, said host computer having TXin and TXdone queues and RXfree and RXdone queues; and,
   means within said RX and TX blocks for implementing a multi-word frame descriptor format utilized by said queues and said peripheral component interface, said multi-word frame descriptor formats supporting an Optimized Mode M format.

* * * * *